(12) United States Patent
Tuchrelo et al.

(10) Patent No.: US 12,458,040 B2
(45) Date of Patent: *Nov. 4, 2025

(54) INTERNAL CLEAN-IN-PLACE METHOD AND APPARATUS

(71) Applicant: RTA Associates, LLC, Victor, NY (US)

(72) Inventors: Robert Tuchrelo, Williamson, NY (US); Nathan E. Smith, Hamlin, NY (US); Richard T. Aab, Fairport, NY (US)

(73) Assignee: Clean Safer Systems, LLC, Victor, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,447

(22) Filed: Sep. 25, 2023

(65) Prior Publication Data

US 2024/0130393 A1    Apr. 25, 2024
US 2024/0225036 A9    Jul. 11, 2024

Related U.S. Application Data

(63) Continuation of application No. 17/732,672, filed on Apr. 29, 2022, now Pat. No. 11,819,039, which is a continuation of application No. 17/239,882, filed on Apr. 26, 2021, now Pat. No. 11,344,045.

(60) Provisional application No. 63/088,557, filed on Oct. 7, 2020.

(51) Int. Cl.
*A23G 9/30* (2006.01)
*B08B 9/032* (2006.01)

(52) U.S. Cl.
CPC .............. *A23G 9/30* (2013.01); *B08B 9/0323* (2013.01); *B08B 9/0325* (2013.01)

(58) Field of Classification Search
CPC .......... A23G 9/30; B08B 9/0325; B08B 9/30; B08B 9/0321; B08B 9/0323
See application file for complete search history.

(56) References Cited

U.S. PATENT DOCUMENTS

| | | | |
|---|---|---|---|
| 2004/0118291 A1 | 6/2004 | Carhuff et al. | |
| 2008/0041876 A1* | 2/2008 | Frank ..................... | A23G 9/045 222/144.5 |
| 2012/0055952 A1 | 3/2012 | Frank et al. | |
| 2020/0375214 A1 | 12/2020 | Koehl et al. | |

* cited by examiner

*Primary Examiner* — Michael E Barr
*Assistant Examiner* — Kevin G Lee
(74) *Attorney, Agent, or Firm* — Douglas R. Smith, Esq.; Harter Secrest & Emery LLP

(57) ABSTRACT

A Clean in Place assembly for a food processor includes a self-cleaning valve assembly, wherein the self-cleaning valve assembly is in fluid communication with a food flow path in the food processor. The self-cleaning valve assembly includes a valve receiving chamber and valve configured to selectively fluidly connect a food flow path inlet port to a food flow path outlet port; fluidly connect the food flow path inlet port to a multivalent port; and fluidly connect a treating solution to a dead space between the valve and the valve receiving cavity. Food product can be selectively drained or retained in food flow path, wherein the self-cleaning valve can be continuously or intermittently exposed to a treating solution for treating non-food flow path portions of the self-cleaning valve assembly.

13 Claims, 17 Drawing Sheets

Side View
Valve closed

Cutaway side view
Valve open
(dispensing product for- consumption)

Cutaway top view
Valve open
(redirection product mix to a drain catch etc.)

DRAW VALVE
ISOLATED FROM
CIP CHAMBER

INTERNAL CLEAN-IN-PLACE METHOD AND APPARATUS

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

Field of the Invention

The present disclosure relates to an apparatus and method for treating at least a portion of a food processor with a treating solution and in a further configuration to an apparatus and method for treating at least a portion of a food flow path in the food processer with the treating solution, wherein the treatment can include at least one of washing, cleaning, rinsing or sanitizing.

Description of Related Art

It is generally understood that fluid dispensing systems having fluid lines that carry fluids to a point of use need cleaning from time to time in order to ensure that no deposits or microorganisms collect in the fluid lines. For example, beverage distribution systems employ the use of beverage lines to carry beverages from beverage containers, or tanks, to dispensing units, which dispense the beverages to drinking containers. If for some reason, these beverage lines are not cleaned on a regular basis, the collection of bacteria and deposits therein may contaminate the beverages thereby making the beverages unsafe to drink. Moreover, in commercial restaurant settings, food and health regulations actually require the periodic cleaning of beverage dispensing systems.

Similarly, food processors can include a food flow path that requires periodic rinsing, cleaning and/or sanitizing.

It is well known to use portable chemical dispenser systems to clean out beverage lines and other components of beverage dispensing systems. With these portable systems, users have become quite effective in meeting the various requirements imposed by food and health regulations. However, these prior art methods are extremely time consuming and require the attention of at least one person to manually move the chemical dispense systems between each of the various beverage lines that require cleaning in a particular beverage dispense system. To add to the frustration, more and more restaurants are offering a larger variety of beverages than offered in years past, thereby making an extremely time demanding process even more demanding.

Therefore, a need exists for a system for selectively washing, rinsing, cleaning and/or sanitizing a food flow path in a food processor with reduced operator input and time, while providing enhanced efficacy of the treatment.

BRIEF SUMMARY OF THE INVENTION

In one configuration, the present disclosure provides a food processor having a food flow path extending from an upstream portion to a downstream portion; a freezer chamber in the food flow path; and a self-cleaning valve fluidly connected to the food flow path, the self-cleaning valve including a valve body defining a valve receiving cavity and a valve moveably disposed within the valve receiving cavity to define a dead space between an exterior surface of the valve and the valve receiving cavity, wherein the valve includes an alpha passage extending between a first alpha passage port and a second alpha passage port, and wherein the valve is configured to fluidly connect the dead space to one of the food flow path, an internal path treating solution line, and an external path treating solution feed line.

In a further configuration, the food processor includes a food flow path extending from an upstream portion to a downstream portion; a freezer chamber in the food flow path; and a flow control valve connected to the food flow path, wherein the flow control valve is a self-cleaning valve; wherein the self-cleaning valve includes a valve body defining a valve receiving cavity having at least one of (i) an external path treating solution inlet port, (ii) an internal path treating solution inlet port, and (iii) a food flow path inlet port; a valve at least partly disposed within the valve receiving cavity, and a first body-valve seal and a spaced apart second body-valve seal each of the first body-valve seal and the second body-valve seal being disposed between the valve and the valve receiving cavity, wherein the valve receiving cavity, the valve, the first body-valve seal and the second body-valve seal at least partly define a dead space between an exterior of the valve and the valve receiving cavity.

It is contemplated the self-cleaning valve assembly of the food processor can further include a valve receiving cavity having (i) a food flow path inlet port; (ii) a food flow path outlet port; (iii) an internal path treating solution inlet port, and (iv) a multivalent port (which could be a recirculation port and/or a drain port); and the valve being moveable relative to the valve receiving cavity and the valve having an alpha passage extending between a first alpha passage port and a second alpha passage port, a beta passage extending between a first beta passage port and a second beta passage port and an external channel, wherein the valve and the valve receiving cavity are configured to selectively: (i) fluidly connect the food flow path inlet port to the food flow path outlet port; (ii) simultaneously fluidly connect (aa) the food flow path inlet port to the multivalent port and (bb) fluidly connect the alpha passage to the internal path treating solution inlet port; (iii) fluidly connect the internal path treating solution inlet port to one of the food flow path inlet port and the food flow path outlet port; and (iv) simultaneously fluidly connect (cc) the internal path treating solution inlet port to the food flow path inlet port and (dd) fluidly connect the multivalent port to the food flow path outlet port.

The present disclosure also includes a food processor having a reservoir configured to retain a food product; a food flow path connected to the reservoir and extending from an upstream portion to a downstream portion, the food flow path including a freezer chamber having a inlet port for receiving food product and an outlet port for passing food product from the freezer chamber; a supply of treating solution; a recirculation line extending from the supply of treating solution and selectively fluidly connected to at least one of the food flow path, the inlet port, and the outlet port; and a self-cleaning valve selectively fluidly connecting the recirculation line to the outlet port, the self-cleaning valve including (i) a valve body having a valve receiving cavity, the valve receiving cavity including a food flow path inlet port and a valve body outlet port; and (ii) a valve disposed in the valve receiving cavity, the valve moveable relative to the valve receiving cavity and defining a dead space between an exterior surface of the valve and the valve receiving cavity.

The present disclosure further a food processor having a food flow path extending from an upstream portion to a downstream portion; a freezer chamber in the food flow path; a dispensing valve in the food flow path to selectively permit passage of food product from the freezer chamber, wherein the dispensing valve includes (i) a valve body defining a valve receiving cavity; (ii) a valve at least partly retained within the valve receiving cavity; (iii) a body-valve seal contacting the valve body and the valve; and (iv) a compression surface acting on the body-valve seal, the compression surface moveable between a first position and a second position to increase a pressure of the body-valve seal on one of the valve body and the valve.

A method is provided including providing a food flow path having a freezer chamber in the food flow path; fluidly connecting a flow control valve to an inlet of the freezer chamber, the flow control valve configured to selectively permit or preclude passage of food product into the freezer chamber; fluidly connecting a dispensing valve to an outlet of the freezer chamber, the dispensing valve including a valve body defining a valve receiving chamber and a valve, the valve receiving chamber and the valve defining a dead space between an exterior of the valve and the valve receiving chamber; and passing a treating solution through the dead space A further method is provided including providing a food flow path configured to pass a food product from a freezer chamber through a dispensing valve, the dispensing valve having a dead space separate from the food flow path, the dead space at least partly defined by valve receiving cavity and a valve moveable relative to the valve receiving cavity; and fluidly connecting the dead space to a treating solution line.

BRIEF DESCRIPTION OF THE SEVERAL VIEWS OF THE DRAWING(S)

FIGS. 9A-E are alternative profiles of valves.

Figure 10:
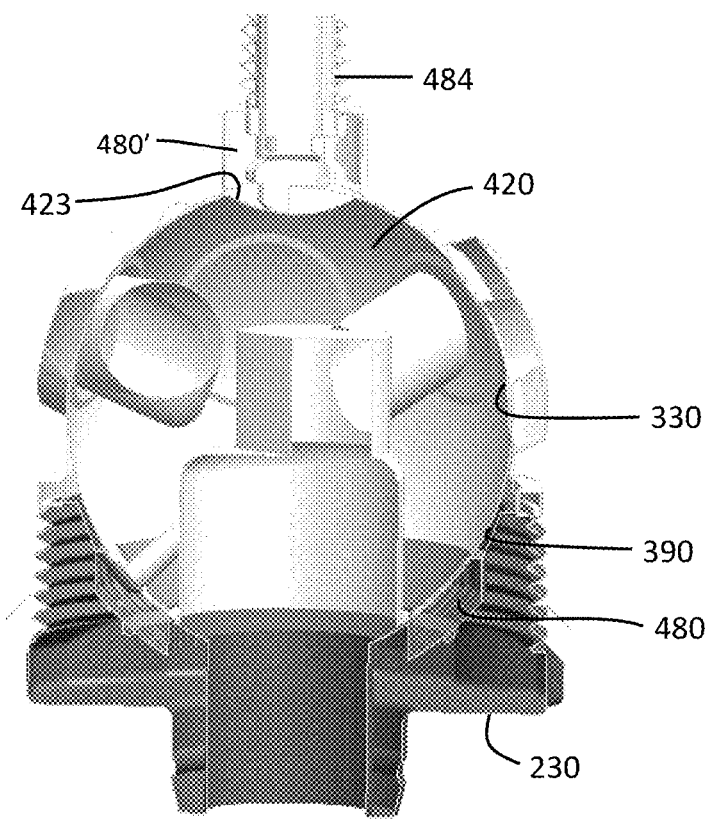

FIG. 10 is a front cross sectional view of the self-cleaning valve assembly.

Figure 11:
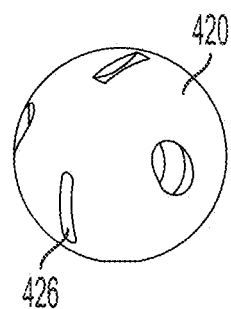

FIG. 11 is a perspective view of a representative valve.

Figure 12:
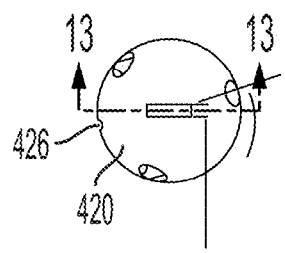

FIG. 12 is a top plan view of the valve of FIG. 11.

Figure 13:
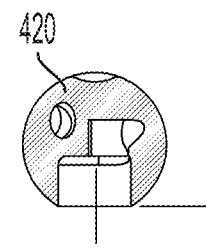

FIG. 13 is a cross sectional view taken along line 13-13 of FIG. 12.

Figure 14:
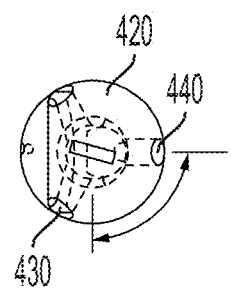

FIG. 14 is a top plan view of the valve of FIG. 11 showing internal passages in phantom.

Figure 15:
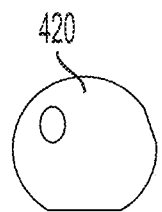

FIG. 15 is a left side elevational view of the valve of FIG. 11.

Figure 16:
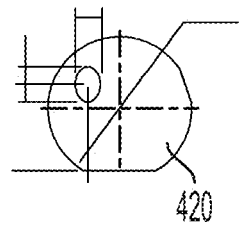

FIG. 16 is a right side elevational view of the valve of FIG. 11.

Figure 17:
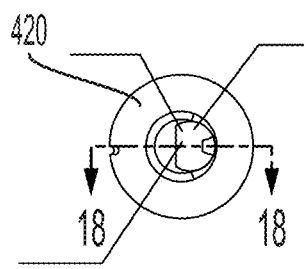

FIG. 17 is a bottom plan view of the valve of FIG. 15.

Figure 18:
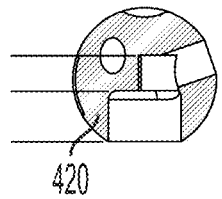

FIG. 18 is a cross sectional view taken along line 18-18 of FIG. 17.

Figure 19:
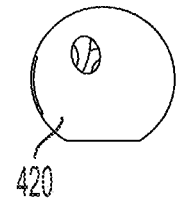

FIG. 19 is a side elevational view of a valve showing an external channel.

Figure 20:
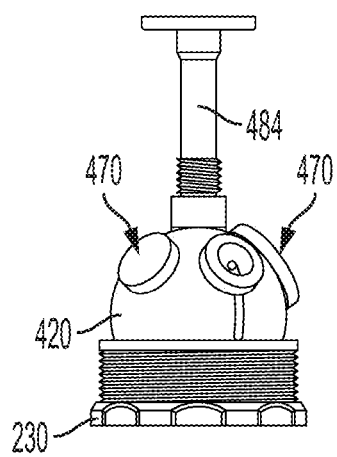

FIG. 20 is a side elevational view of a valve, seal pads and control shaft.

Figure 21:
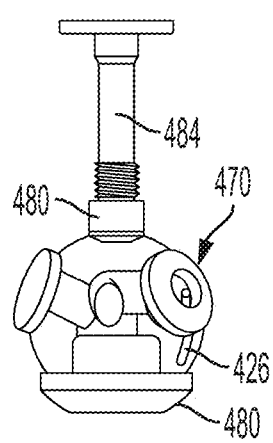

FIG. 21 is a side elevational view of a valve, seal pads and control shaft showing, in phantom, an alpha passage and a beta passage in the valve.

Figure 22:
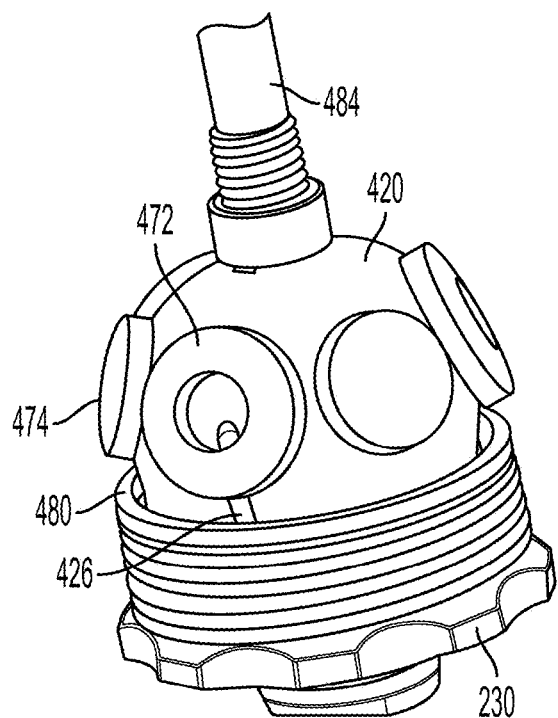

FIG. 22 is a perspective view of a first position of a valve and compression nut.

Figure 23:
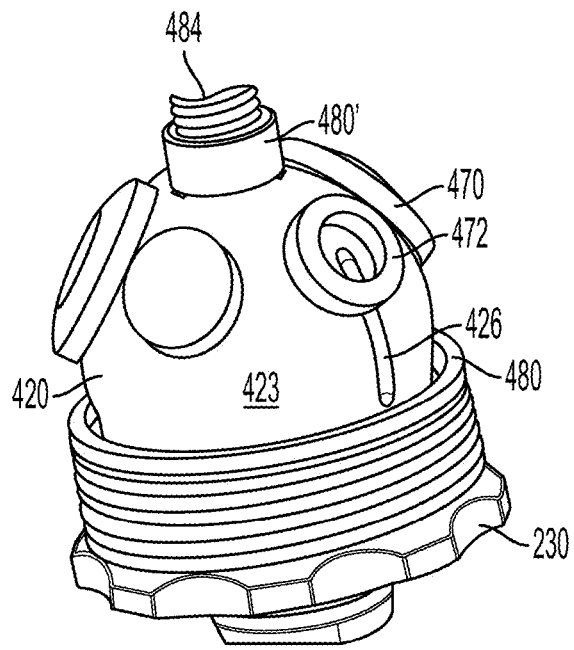

FIG. 23 is a perspective view of a second position of a valve compression nut.

Figure 24:
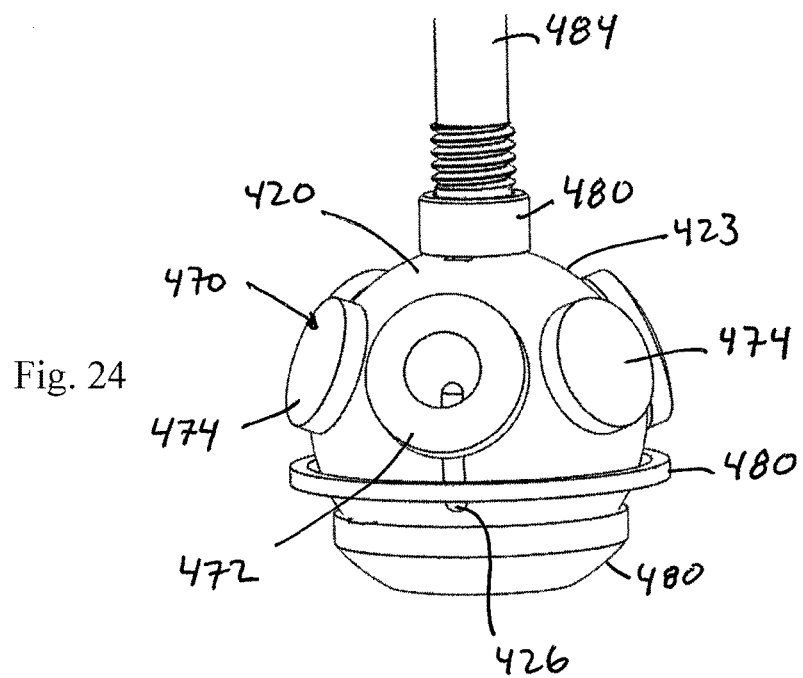

FIG. 24 is a perspective view of a valve showing an external channel on the valve.

Figure 25:
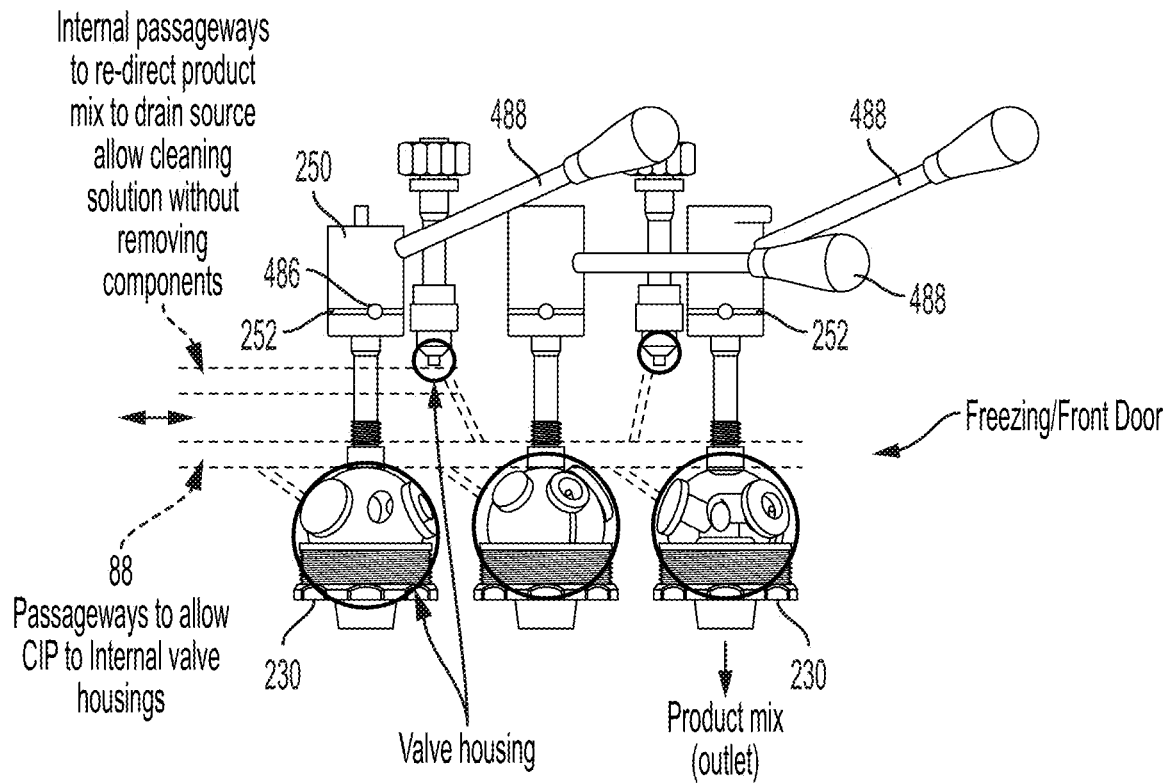

FIG. 25 is an elevational view of a plurality of self-cleaning valve assemblies.

Figure 26:
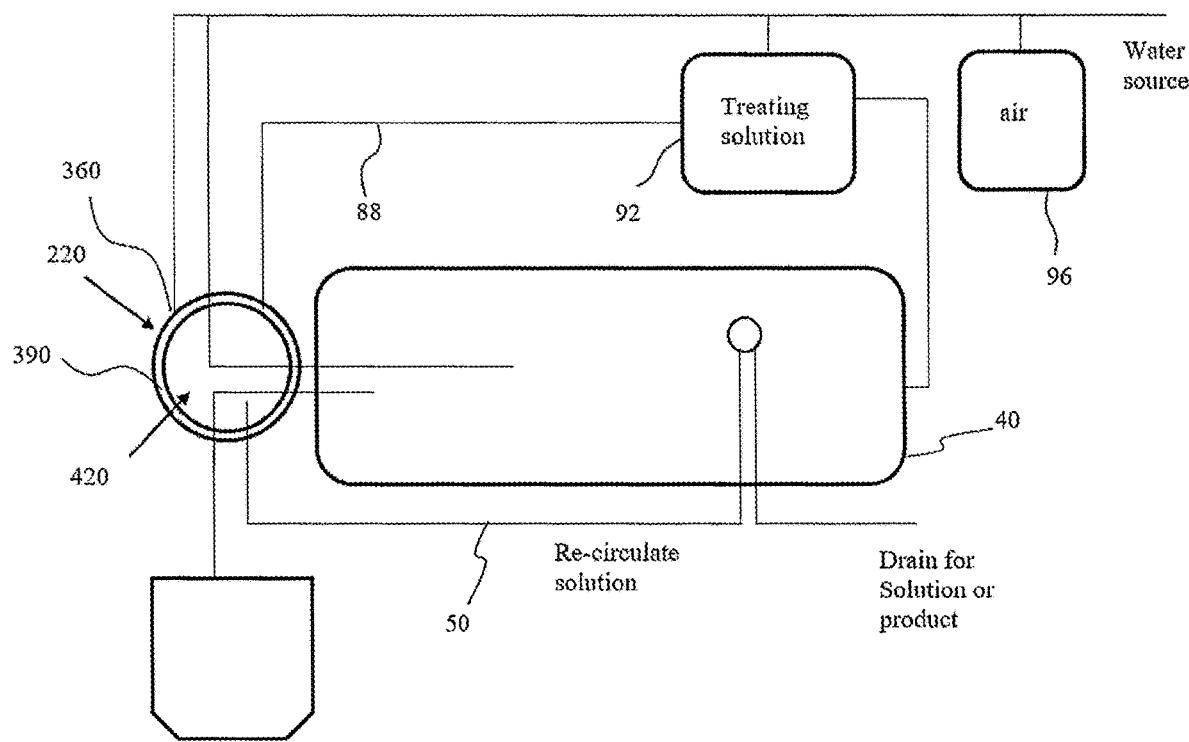

FIG. 26 is a schematic showing an alternative flow paths in the food processor having the present self-cleaning valve assembly.

Figure 27:
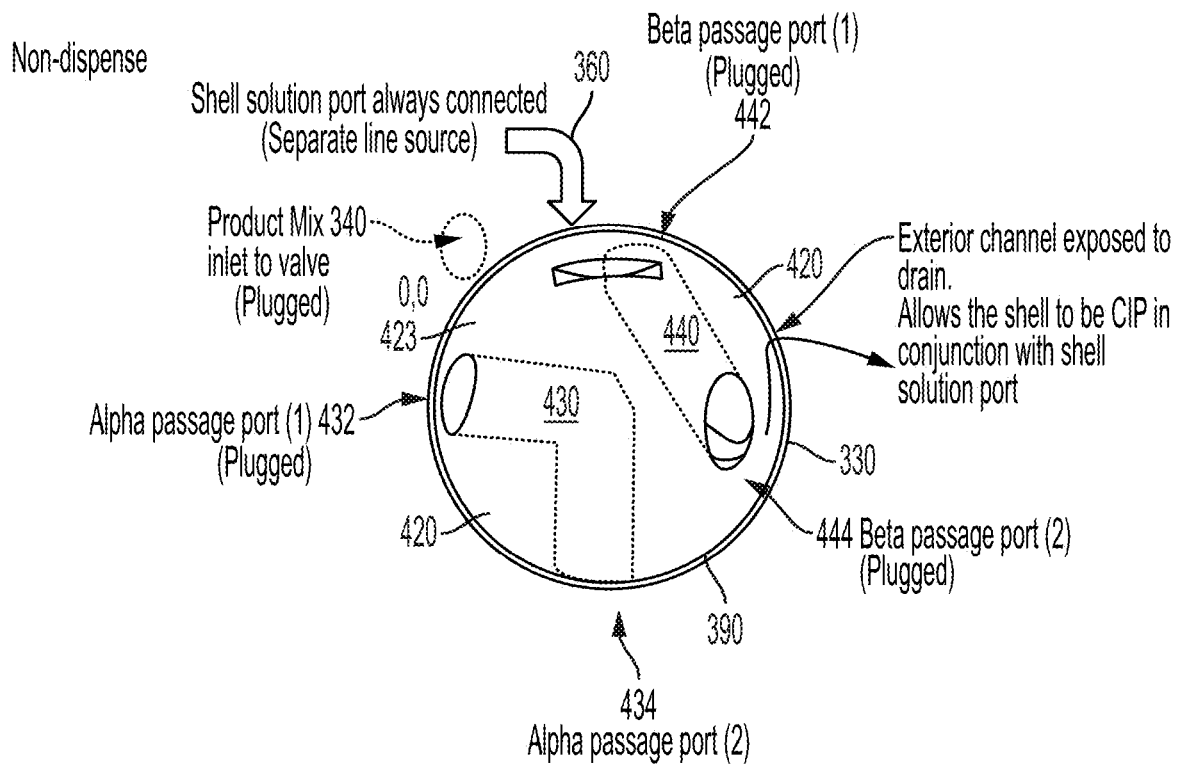

FIG. 27 is a perspective view of flow paths through the self-cleaning valve assembly in a first orientation of the valve.

Figure 28:
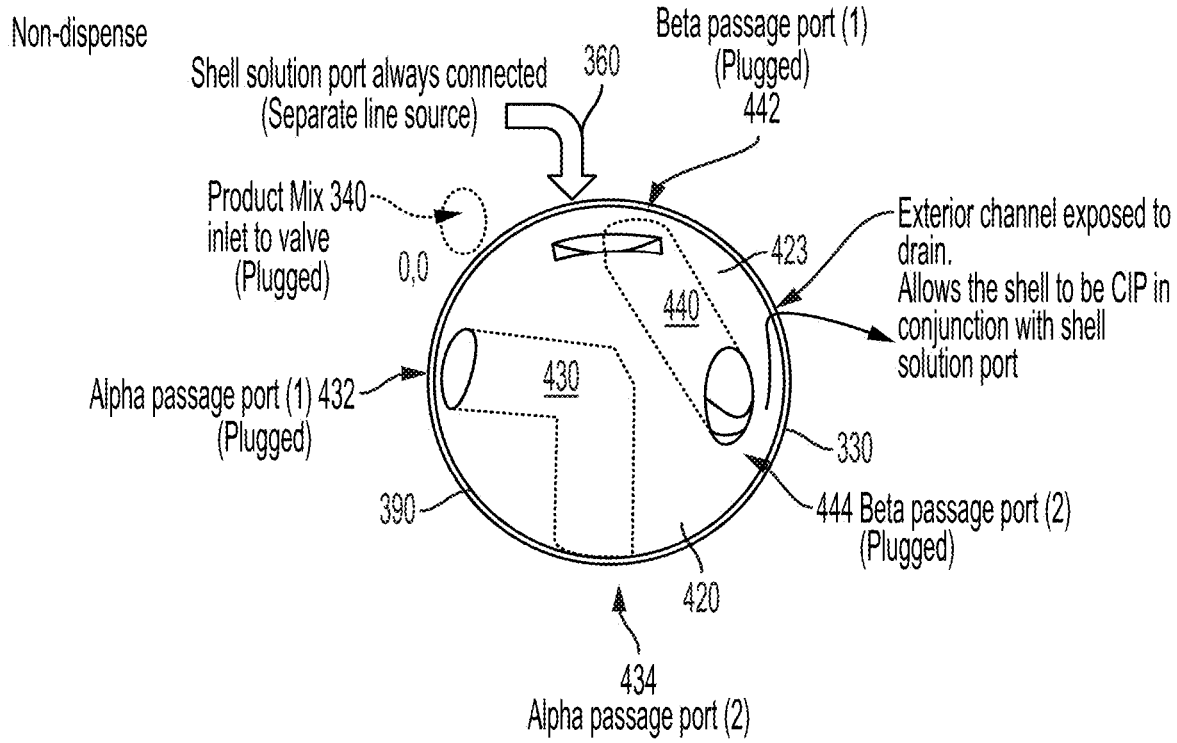

FIG. 28 is a perspective view of flow paths through the self-cleaning valve assembly in a second orientation of the valve.

Figure 29:
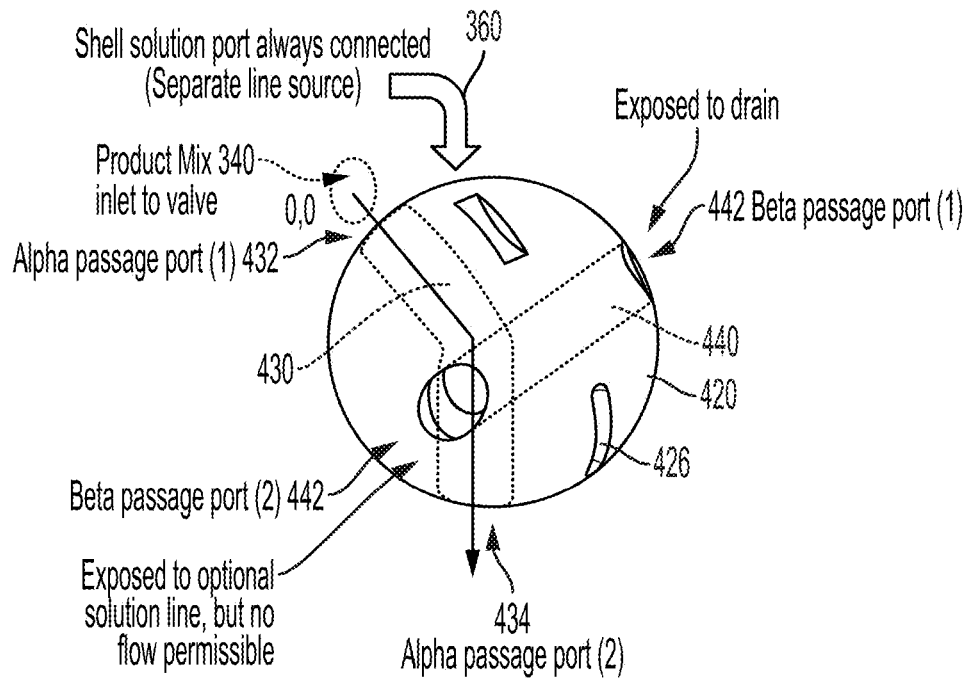

FIG. 29 is a perspective view of flow paths through the self-cleaning valve assembly in a third orientation of the valve.

Figure 30:
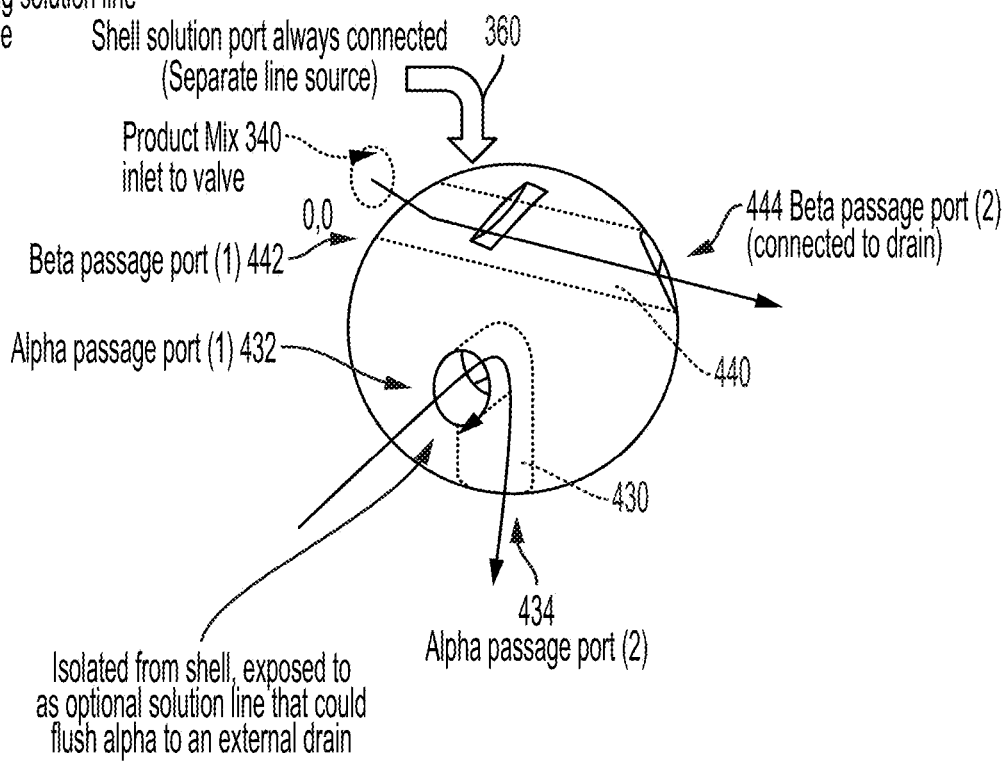

FIG. 30 is a perspective view of flow paths through the self-cleaning valve assembly in a fourth orientation of the valve.

Figure 31:
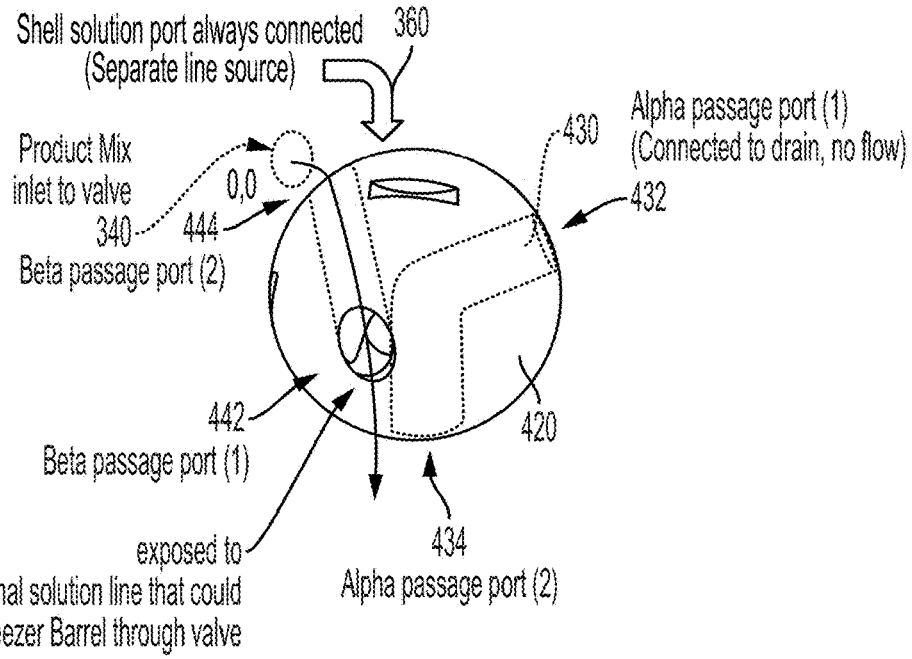

FIG. 31 is a perspective view of flow paths through the self-cleaning valve assembly in a fifth orientation of the valve.

Figure 32:
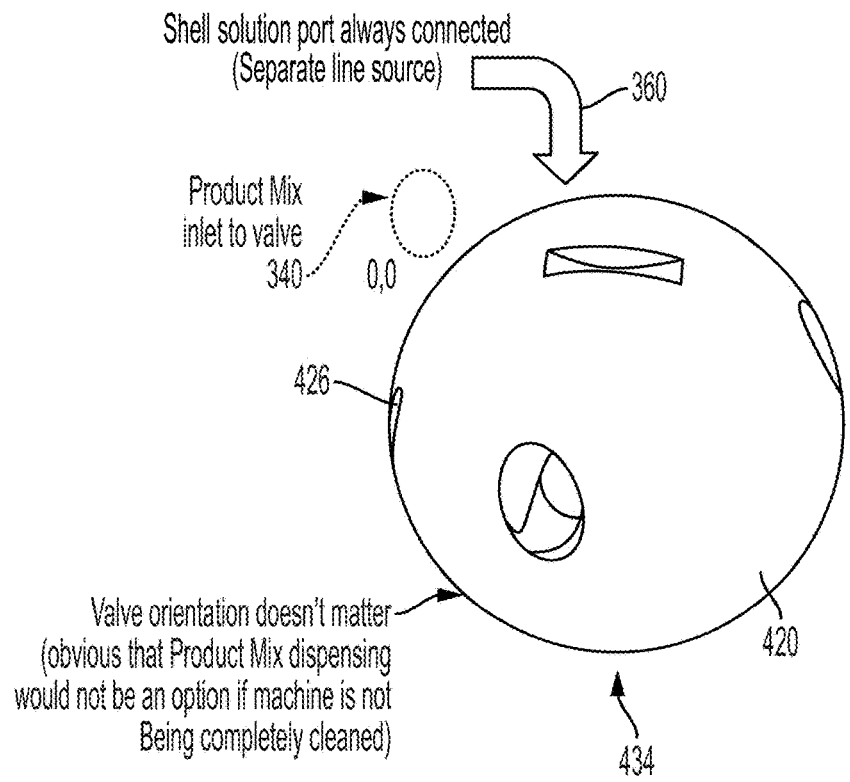

FIG. 32 is an enlarged perspective view of flow paths through the self-cleaning valve assembly in the fifth orientation of the valve.

Figure 33:
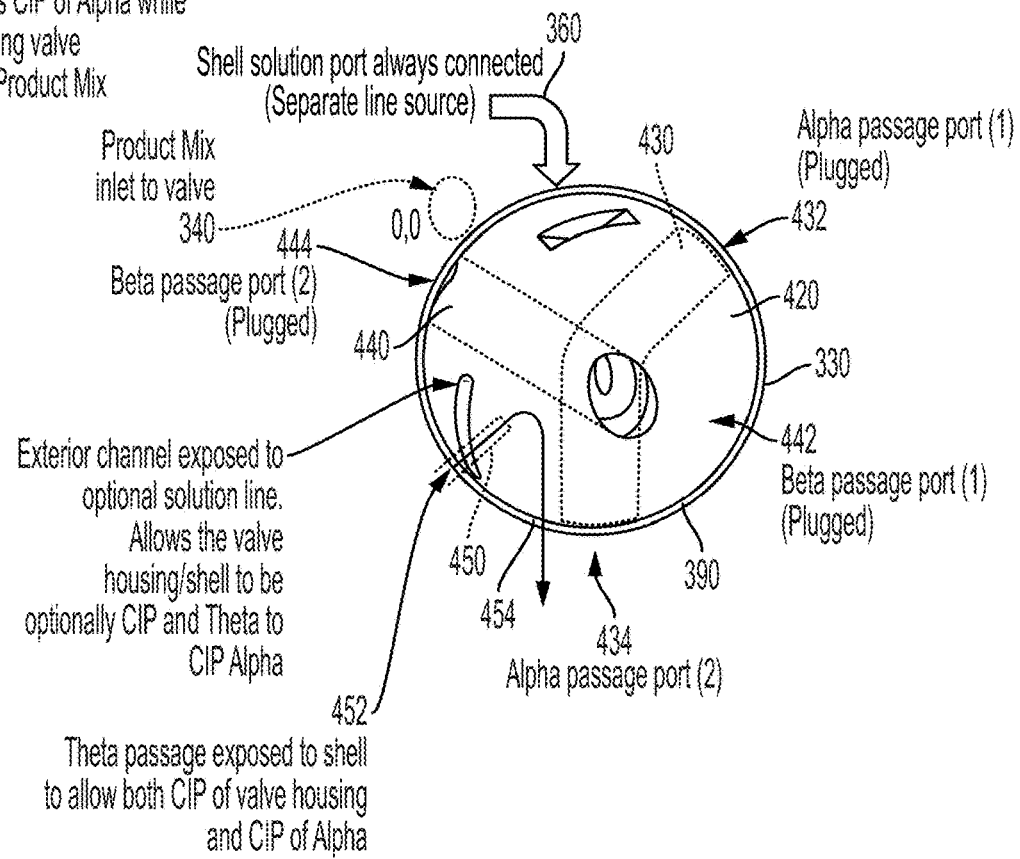

FIG. 33 is a perspective view of flow paths through the valve having an alpha passage, a beta passage and a theta passage.

Figure 34:
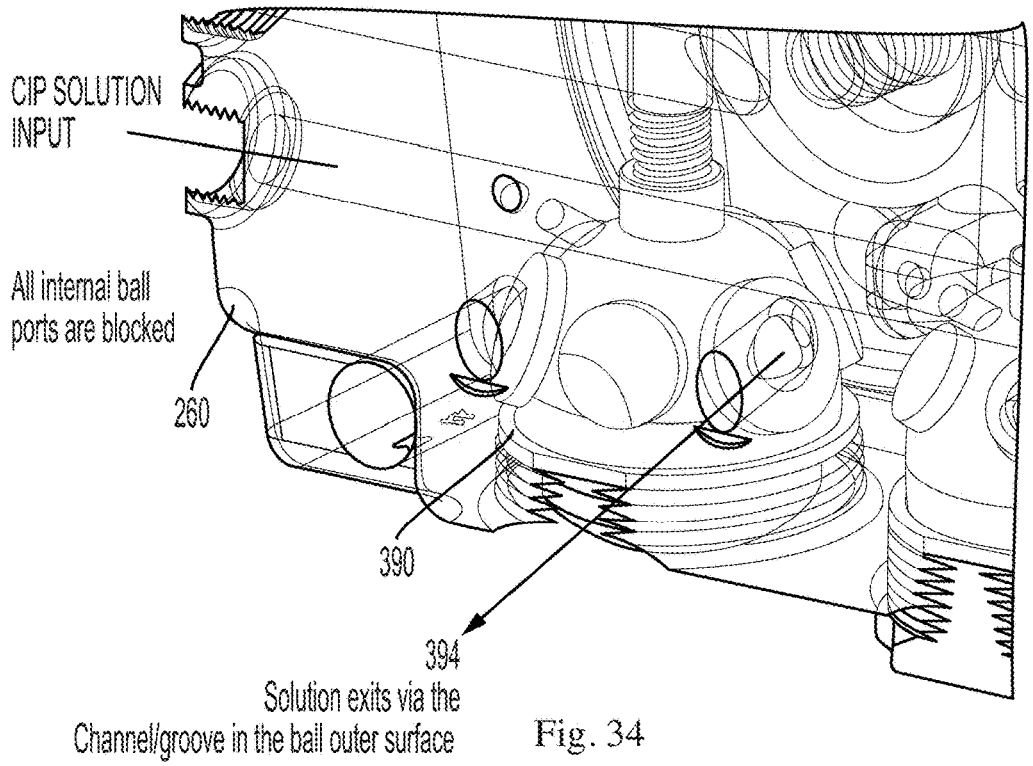

FIG. 34 is a partial cross sectional view of a valve in a valve body.

Figure 35:
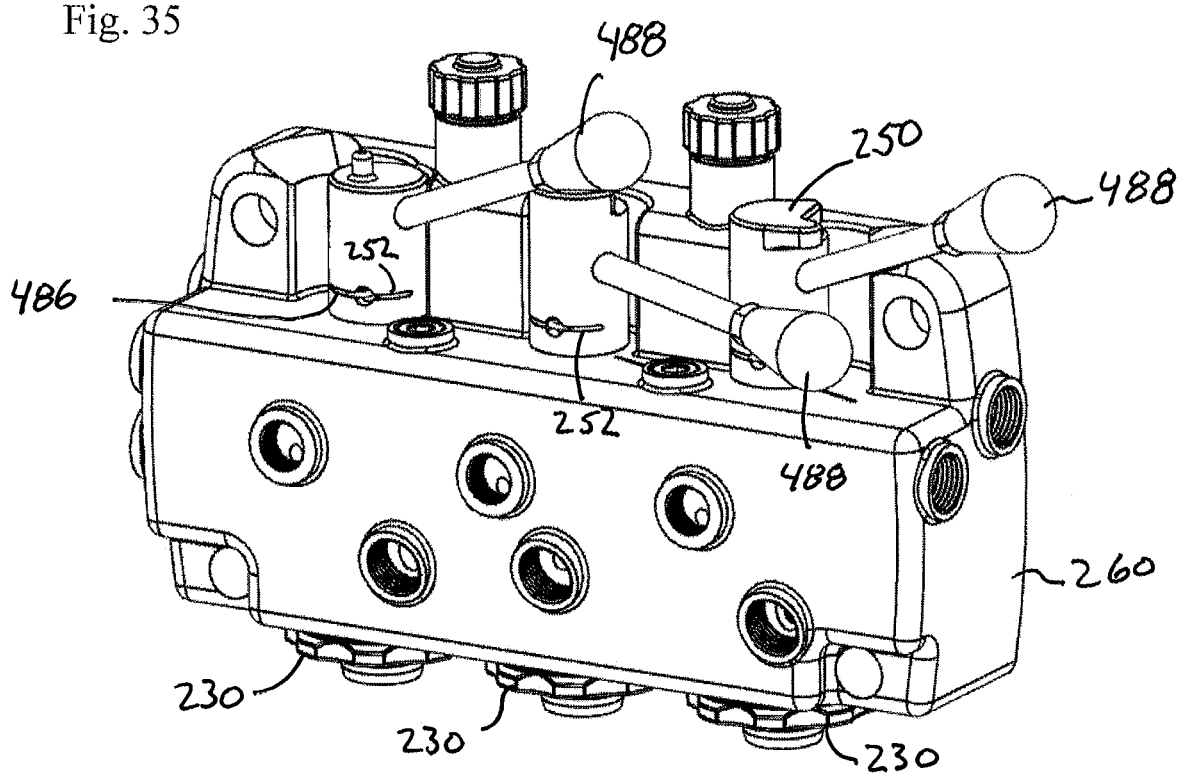

FIG. 35 is a perspective view of a manifold assembly operably retaining three self-cleaning valve assemblies.

Figure 36:
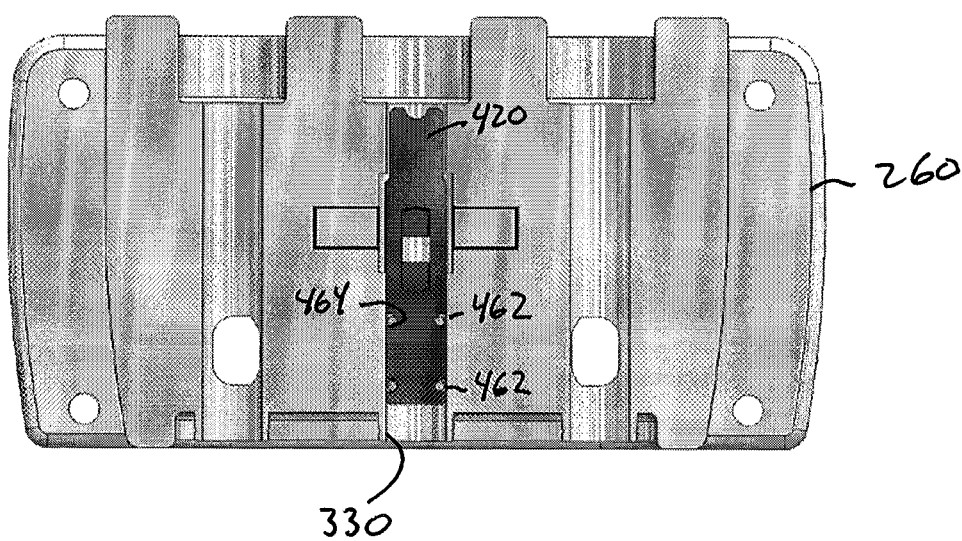

FIG. 36 is a cross sectional view showing a self-cleaning valve assembly in a draw valve configuration in a first position.

Figure 37:
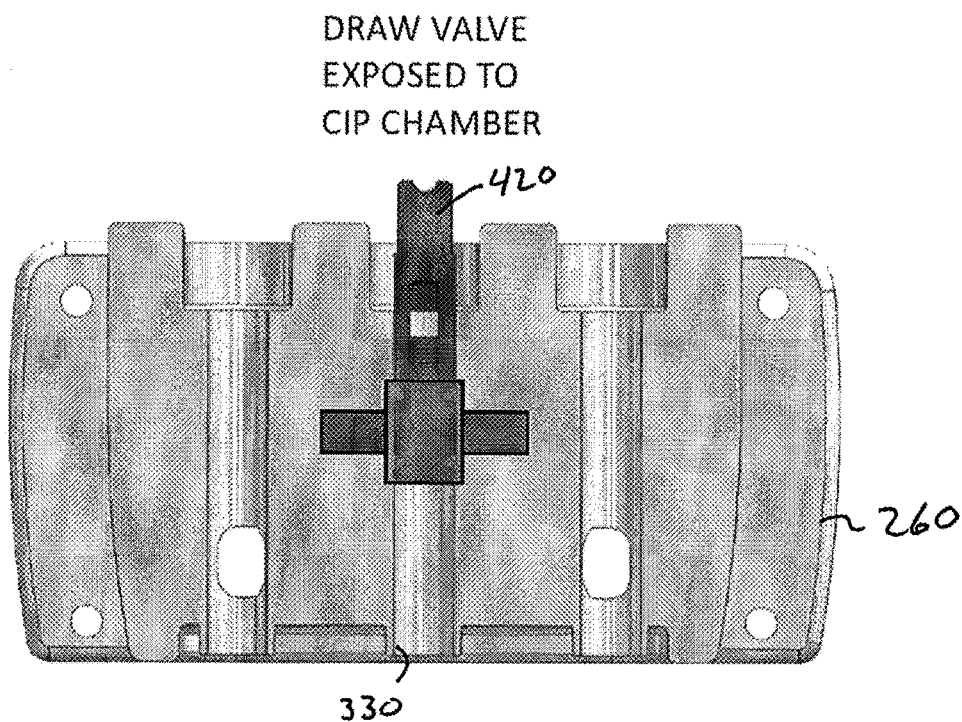

FIG. 37 is a cross sectional view showing a self-cleaning valve assembly in a draw valve configuration in a second position.

Figure 38:
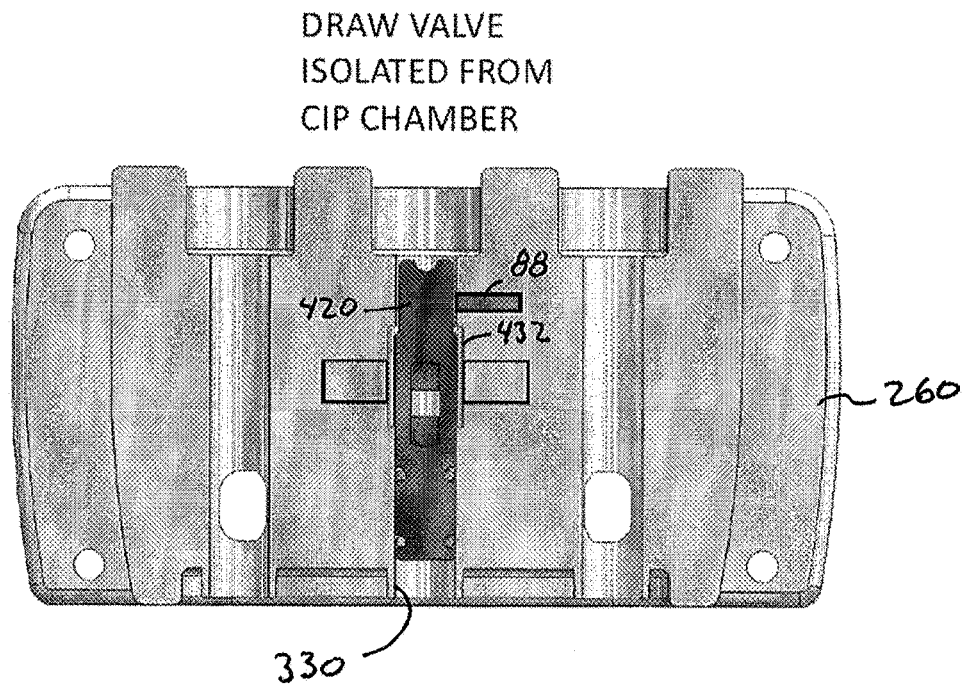

FIG. 38 is a cross sectional view showing a self-cleaning valve assembly in a draw valve configuration in a third position.

Figure 39:
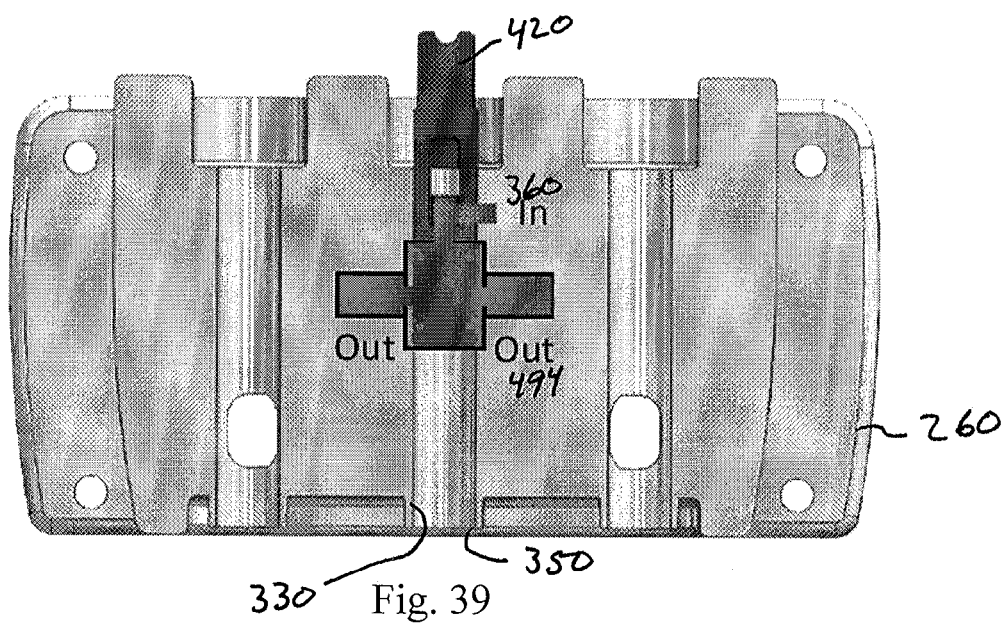

FIG. 39 is a cross sectional view showing a self-cleaning valve assembly in a draw valve configuration in a fourth position.

DETAILED DESCRIPTION OF THE INVENTION

FIGS. 1-4 illustrate representative food processors 10. The food processor 10 can be any of a variety of configurations for processing any of a variety of food products including, but not limited to, frozen or chilled food product including but not limited to, beverages such as sodas, beer or wine, ice or iced food products, desserts, diary based products as well as cooked and/or extruded food product.

The food processor 10 can include any variety of devices, including but not limited to soft serve machines, batch freezers, slush freezers, shake freezers, blended ice machines or food processors for extruding food products which include flows, grains or meats as well as liquid dispensers for beverages including soft drinks, diary drinks or alcoholic beverages such as fermented or distilled spirits. Thus, the food product can be any corresponding product for consumption, wherein the food product may be subjected to processing that includes temperature control including but not limited to raising or lower a temperature, food product mixing, blending, altering, processing or extruding by the food processor 10. The food product can include precursor food products that change composition or consistency by virtue of being processed along the food flow path 20, wherein they can be converted to a processed food product.

Figure 2:
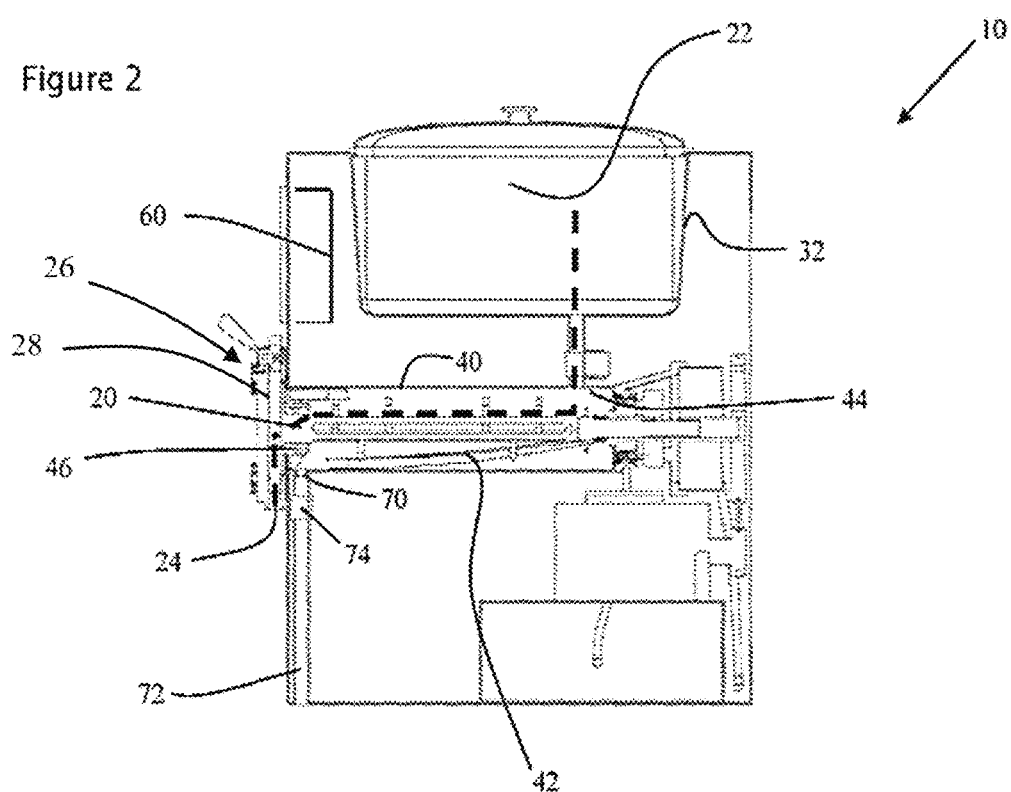
FIG. 2 is a side elevational schematic of a further representative food processor.
Figure 3:
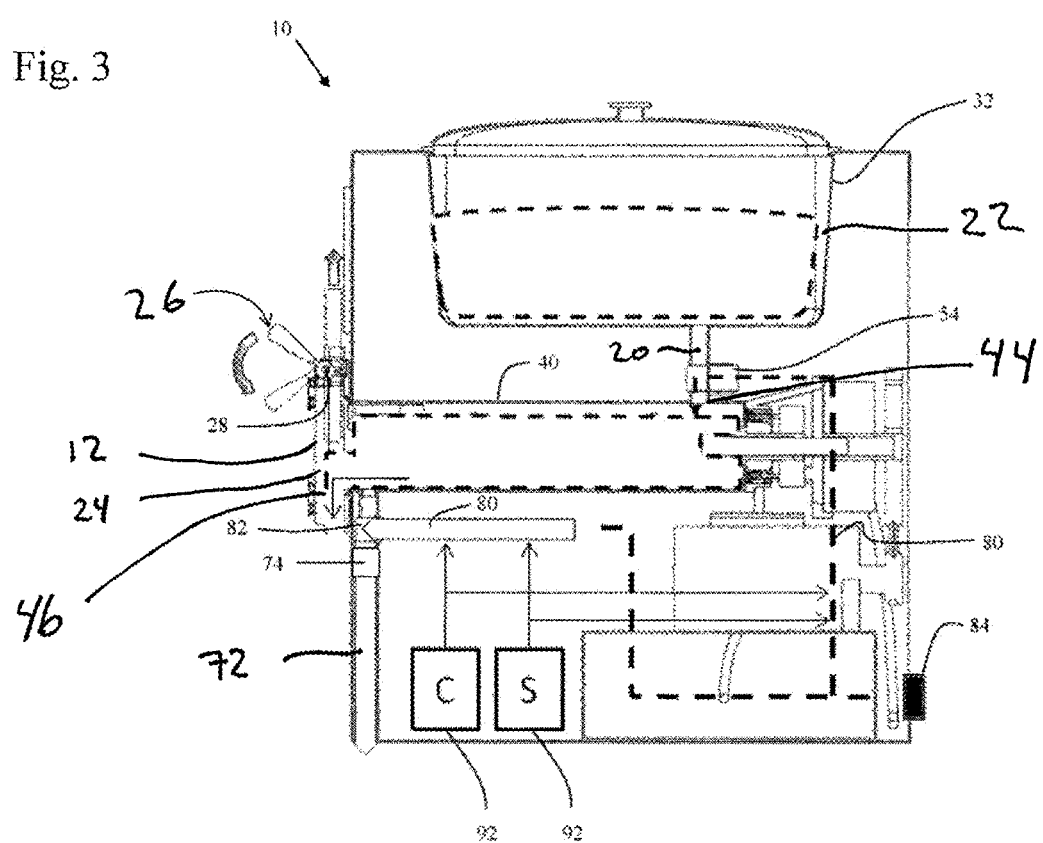
FIG. 3 is a side elevational schematic of another representative food processor.
Figure 4:
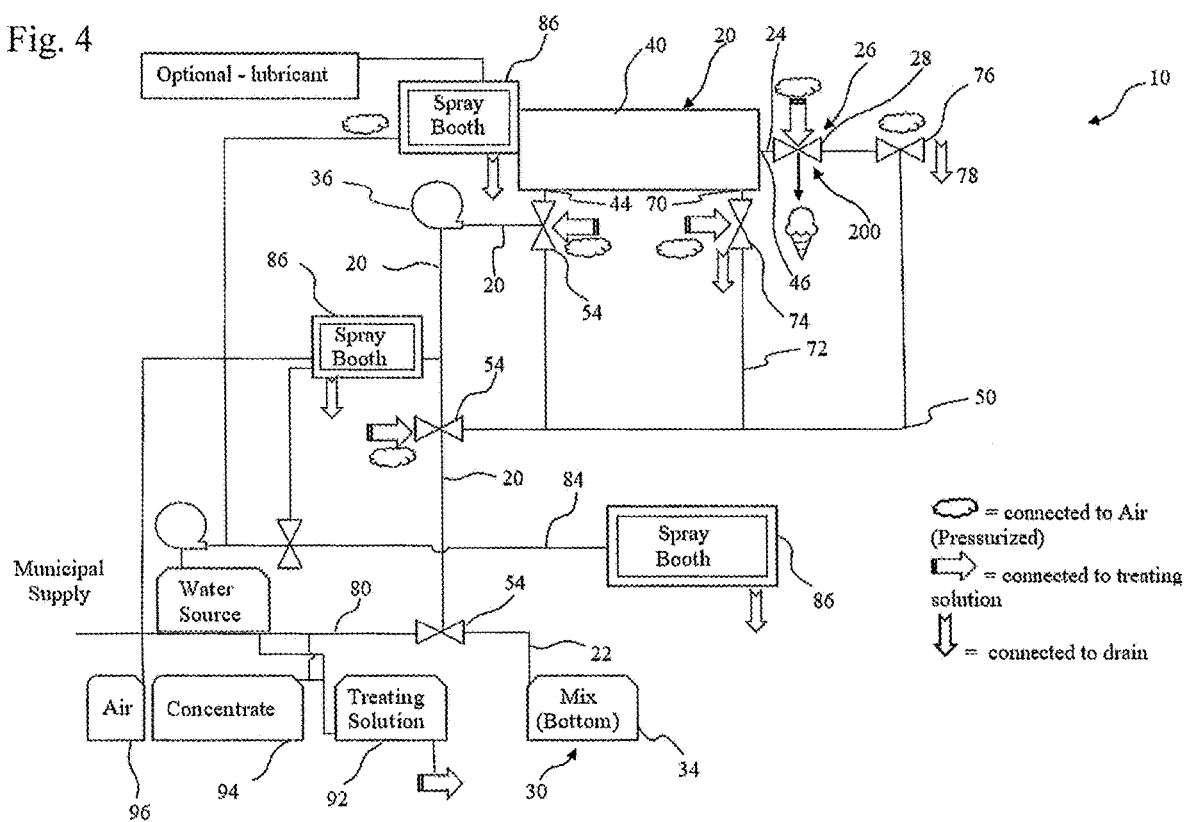
FIG. 4 is schematic of an additional representative food processor.

Referring to FIGS. 2-5, in select configurations, the food processor 10 includes a first food flow path 20 and a second food flow path 20' (FIG. 1) each extending from a corresponding input or upstream portion or end 22, such as a food product reservoir 30, which can be a feed tube, a bag, a box, a bag-in-box 34 (FIG. 4), a line inlet or a hopper 32 (FIGS. 1-3 and 5) to an output or downstream portion or end 24, such as a dispensing interface 26 from which the food product (or a food product precursor or food product constituent all herein collectively referred to as food product) exits the food processor. Thus, while the food product reservoir 30 is shown as a hopper 32, the reservoir can be the hopper as well as the bag-in-box such that the food product can be introduced from the feed tube, bags, line inlets, hoppers, bags or boxes located above, at or below a level of the food processor 10 or a portion of the food processor. As seen in FIG. 4, the food processor 10 can include a mix pump 36 in the food flow path 20 for drawing food product from the food product reservoir 30, such as the bag in a box 34, and passing the food product along the food flow path. A typical food product reservoir 30 is often referred to in the industry as a bag-in-box 34.

Figure 1:
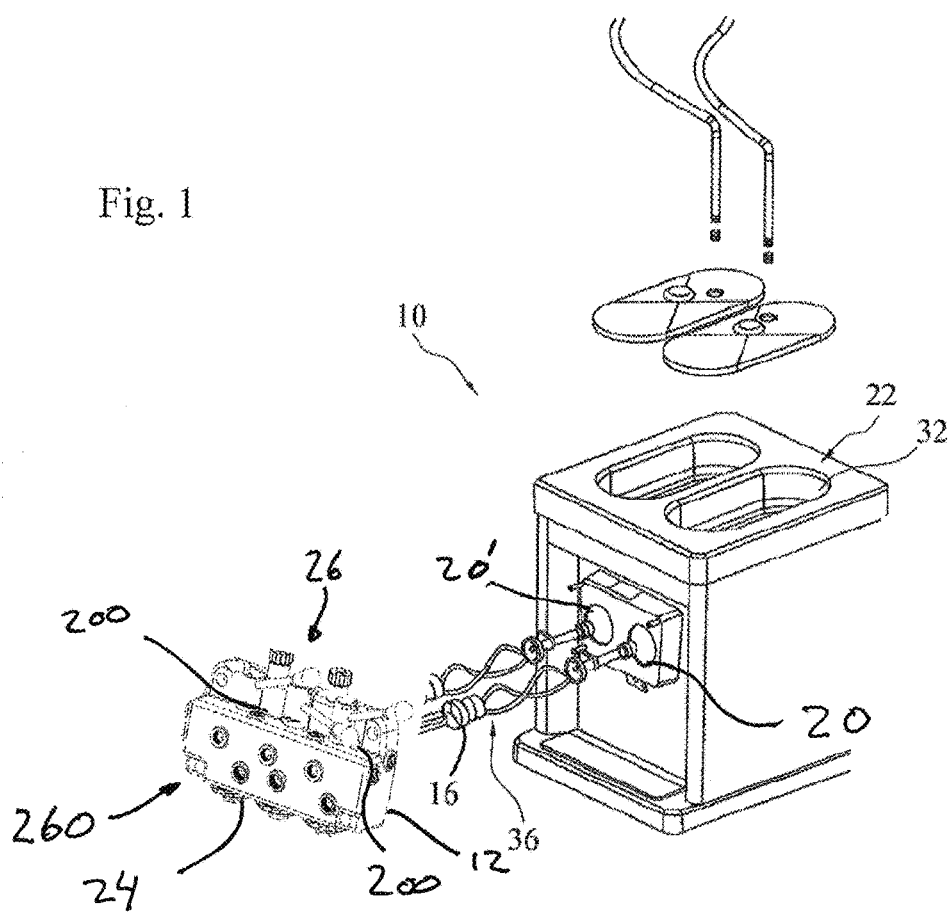
FIG. 1 is an exploded perspective view of a representative food processor.

The input or upstream end 22 of the food flow path 20 is shown in FIG. 1, above the output or downstream end, while the input 22 can be located below the output 24, FIG. 4, wherein the food product is pumped up from the food product reservoir 30, such as the bag in a box 34, and along the food flow path to exit at the dispensing interface 26. The food product reservoir 30 can be integral, single use such as bag-in-box 34, or multiple use such as the hopper 32. Thus, the food product reservoir 30 can be located below the freezer chamber 40 and food product pumped up into the food flow path 20 by the mix pump 36.

The food product passes, in a normal or forward direction along each food flow path 20, from the input 22 to the output 24. Thus, in terms of the normal or forward flow direction along each food flow path 20, each path includes an upstream portion and a downstream portion.

Although the food processor 10 is set forth in terms of a first food flow path 20 and a second food flow path 20', it is understood that an additional plurality of food flow paths can be employed such as three, four, five or more. As set forth below, the present disclosure is readily scalable to accommodate additional flow paths. It is further understood each food flow path 20 can include a plurality of inputs 22 with a corresponding smaller or a greater number of outputs 24 depending on the intending operating function of the food processor 10. The plurality of inputs 22 and plurality of outputs 24 can correspond to the number inlet ports and outlet ports of a processing station, or can be greater or smaller in number, depending on the configuration of the food processor 10. However, for purposes of simplicity, the schematics of FIGS. 4 and 5 set forth a single food flow path 20.

Alternatively, each food flow path 20 can function primarily as a conduit from the input end 22 to the dispensing interface 26. In these configurations, the food processor 10 can function merely to selectively dispense the food product or can provide an alteration or conditioning of the food product such as temperature change, carbonation as well as mixing (compounding). Examples of the food processor 10 having these food flow paths 20 include dispensing devices such as automated soda dispensers, beer and wine dispensers.

In certain configurations, the food flow path 20 terminates at the dispensing interface 26 which includes at least one dispensing valve 28 for selectively passing or allowing passage of the processed food product from the food processor 10. In certain configurations, the dispensing interface 26 includes a plurality of dispensing valves 28, such as but not limited to one, two, three or more. It is contemplated that each food flow path 20 can include a dispensing valve 28 or a plurality of food flow paths can terminate at a given dispensing valve.

In one configuration of the food processor 10, as shown in FIGS. 1-3, the food processor includes a front door 12 movable between a closed, operating position and an open, maintenance or cleaning position allowing access to internal seals. As known in the art, an interface between the door 12 and the freezer chamber 40 can include a peripheral chamber seal or chamber gasket 16. The door 12 is moveable between a closed (operating) position and an open (maintenance/replacement) position. Although the door 12 is shown in a vertical orientation, it is understood the door can be horizontally disposed or inclined between the horizontal orientation and the vertical orientation. The door 12 can be releasably retained in the closed position by at least one hand actuated fastener, such as a thumb screw. Thus, an operator can access the internal portion of the food processor without requiring tools, by removing or opening the door 12.

The food processor 10 includes motors for driving the moving components as well as a refrigeration system, including a compressor and radiator as known in the art.

Referring to FIG. 2, the food processor 10 also includes a controller 60 for selectively controlling the operation of the components of the food processor such as chillers or coolers, agitation components, motors as well as valving for flow control as set forth below. The controller 60 is generally known in the art and includes a processor for implementing instructions and a memory for storing instructions as well as acquired data. The programming of the controller 60 to perform the functions as set forth herein is well known in the art and can be provided by commercially available controllers in food processors, including soft serve machines.

In certain configurations as seen in FIGS. 2-5, each food flow path 20 can incorporate a number of processing stations 40 intermediate the upstream or input 22 (such as the food product reservoir) and the downstream or output 24, (such as a dispensing valve 28). For example, the processing stations 40 can include mixing chambers and temperature control chambers, such as freezer chambers or barrels, along the food flow path 20. The mixing chambers include chambers for mixing ingredients provided in a stream as well as ingredients from different inputs such that the mixing chamber provides a volume for initial combination of different ingredients. The temperature control chambers can be used to heat the food product, wherein the heating merely changes temperature or imparts a chemical change in the food product. Similarly, the temperature control chamber as the freezer chamber, can reduce the temperature of the food product, or impart a chemical change. The freezer chamber can be alternatively referred to as the freezer barrel. A refrigeration system of the food processor 10 is typically thermally coupled to the processing station 40 as a temperature control chamber and in certain configurations, the food product reservoir 30, such as the hopper 32 or the bag-in-box 34.

In further configurations, processing stations 40, such as the mixing chamber and/or temperature control chamber, can include a blade or beater assembly 36, as seen in FIGS. 1 and 2, for agitation of the food product within the chamber, such as by rotation of the assembly within the chamber. Thus, the given processing station 40 can provide mixing, agitation and/or temperature control of the food product. With respect to the mixing or agitation, collectively referred to as mixing, it is understood the mixing can be accomplished by a fixed assembly, wherein the chamber rotates. That is, there is relative motion between the blade or beater assembly 36 and the chamber 40.

As seen in FIGS. 2-4, the processing station 40 includes an inlet port 44 receiving food product from an upstream portion of the food flow path 20 and an outlet port 46 for passing food from the processing station to the downstream portion of the food flow path. It is understood, the processing station can include a plurality of inlet ports 44 for receiving a plurality of components of the food product or receiving the food product from a plurality different sources. Similarly, the processing station 40 can include a plurality of outlet ports 46 for passing the food product to a plurality of different downstream processing stations or dispensing interfaces.

In FIG. 4, wherein the food flow path 20 extends from food product reservoir 30 to the inlet port 44 of the freezer chamber 40. The pump 36 is disposed in this segment of the food flow path 20 to draw food product from the food product reservoir 30 and deliver the food product through the inlet port 44 of the freezer chamber 40.

As seen in FIGS. 2-5, in certain configurations, the food processor 10 optionally includes an optional primary drain port 70 in the food flow path 20 between the input 22 to the output 24, and in certain configurations between the food product reservoir and the dispensing valve 28, and in other configurations between the processing station 40 and the dispensing valve 28, and in select configurations the primary drain port is located in at least one of the processing stations. Thus, the drain port 70 can be upstream of, downstream of, or located within the processing station 40. In one configuration of the food processor 10, the primary drain port 70 is in at least one of the food flow path 20 and the processing station 40, such as the freezer chamber. The primary drain port 70 is separate from the inlet 44 and the outlet 46 of the respective processing station 40 and distinct from the dispensing of the food product from the food processor 10 in the normal production manner through the dispensing interface 26. However, it is understood, the primary drain port 70 is not a requisite for the present treatment of the food flow path 20.

The primary drain port 70 is fluidly connected to a primary drain line 72. As seen in FIG. 4, the primary drain line 72 can be fluidly connected to a recirculation line 50 through the primary drain valve 74.

Although shown as fluidly connected to the recirculation line 50, it is understood the primary drain line 72 can include an internal portion and can terminate at either a fitting for connection to an external drain 78 or include sufficient length to reach the external drain. Thus, the drain port 70 can be fluidly connected to an internal drain, such as a tank or sump, which can be removable from the food processor 10 or configured to be pumped out, as known in the art.

The primary drain valve 74 isolates the primary drain line 72 from the food flow path 20. Specifically, the primary drain valve 74 is configured to selectively pass fluid, including food product, from the food flow path 20 through the primary drain line 72 to the recirculation line 50 and to a system drain valve 76. While the primary drain valve 74 can be spaced from the primary drain port 70, in one configuration the primary drain valve 74 is at the primary drain port 70 and can functionally define the primary drain port.

As seen in FIGS. 2-5, in select configurations of the food processor 10 includes a flow control valve 54 intermediate the food product reservoir 30 such as the bog-in-box 34, feed tube, the inlet 22, or the hopper 32 and the processing station 40. The flow control valve 54 is moveable between a closed position precluding flow from the food product reservoir 30, such as the hopper 32 or the bag in the box 34, to the processing station 40 and an open position permitting flow from the food product reservoir to the processing station. Thus, the flow control valve 54 can function as an isolating valve for selectively isolating a first portion of the flood flow path 20 from a second portion of the food flow path. By isolating a first portion of the food flow path 20, flow between the first portion and a second portion of the food flow path is terminated.

It is contemplated that each of the inlet port 44, the drain port 70 and the outlet port 46 of the processing chamber 40 can be associated with or controlled by a corresponding flow control valve 54. For example, the flow control valve 54 is shown controlling flow in the forward direction along the food flow path 20 into the inlet port 44 of the processing station 40. The primary drain valve 74 selectively controls flow through the primary drain 70 and the dispensing valve 28 selectively controls flow through the outlet port 46 of the processing station 40. It is understood one, two or all of these valves can be self-cleaning valve assemblies as set forth below.

Referring to FIG. 4, the recirculation line 50 is selectively connected to the inlet port 44 through the flow control valve 54, to the primary drain port 70 through the primary drain valve 74 and to the outlet port 46 though the dispensing valve 28, wherein the recirculation line is connected to the system drain valve 76 and thus to the system drain 78.

Referring to FIG. 4, the recirculation line 50 extends from a solution input line 80 to the valve associated with each of the food flow path to inlet port 44, the outlet port 46, and the optional drain port 70 of the freezer chamber 40.

The treating solution input line 80 presents a treating solution, which can include or function as a motive fluid, to the food flow path 20 and into the processing station 40, directly into the processing station or to the valves as set forth below, as well as various treatment portals such as spray booths. In one configuration, the treating solution input line 80 is selectively connected or connectable to the inlet port 44, the outlet port 46 and/or the drain port 70 of the processing chamber 40 such as through the associated respective valves. The treating solution input line 80 includes valving configured to fluidly connect a source of pressurized water such as a public utility water or an integral reservoir. The pressurized water can be provided from an external pressurized source or through a tank and pump in the food processor, as regulated by the controller 60. As set forth below, the treating solution input line 80 can be used to deliver the treating solution to the food flow path 20, the internal path treating solution line, as well as the external path treating solution feed line. While these lines can be separate, they can come from the treating solution input line and hence from a common source of the treating solution, or the separate lines can have separate sources of treating solution.

In certain instances of treating the food flow path 20, including but not limited to cleaning, rinsing, or sanitizing the food processor 10, a treating solution is passed through at least a portion of the food flow path.

The term treating solution is intended to encompass a fluid for treating a portion of the food processor 10 including cleaning, rinsing, or sanitizing solutions, as well as combinations or mixtures. The cleaning, rinsing, or sanitizing referred to herein as treating. For purposes of description, the present system is set forth in terms of using the treating solution, however it is understood the term treating solution encompasses cleaning agents as well as a single constituent solution such as but not limited to water (or other liquid) such as a rinse that may be employed. The term treating solution also includes a gas or vapor such as steam as well as other gas. It is understood, the present system can employ any of a variety of cleaning, rinsing, or sanitizing solution materials including liquids, gases and combinations thereof, including heated water, such as to between 120° F. and 170° F. The treating solution can be at least partly formed by an addition of an acidic or basic wash concentrate to public utility water. Exemplary acidic washes for the treating solution include citric, lactic, malic, acetic, adipic, fumaric, glutaric, tartaric, succinic, propionic, aconitic, sorbic, gluconic, ascorbic, and/or humic acids and at least one of sodium dodecyl sulfate and sodium lauryl sulfate.

The treating solution can include a commercially available product, such as LEXX brand concentrates by ProNatural Brands, wherein the concentrates are introduced to a water flow to create a selected concentration or chemistry of the treating solution.

The flow of the treating solution through the portion of the food flow paths 20 can be in the forward, normal direction, or a reverse direction. The normal, or forward flow, originates at the input 22, or at least an upstream location spaced from the dispensing interface 26, and terminates at the output 24, or at least a downstream location nearer to the dispensing interface. That is, the normal direction includes the same direction as the food product to be dispensed flowing through the food flow path 20. The reverse flow, or reverse direction, originates at the output 24, or at least downstream location (relative to the forward flow) and terminates at the input 22, or at least an upstream location (relative to the forward flow). That is, the reverse flow flows opposite to the direction the food product passes through the food flow path 20 during processing for dispensing from the food processor 10. The reverse flow encompasses flow in a reverse direction along a portion of the food flow path 20 or along at least substantially the entire length of the food flow path.

Figure 5:
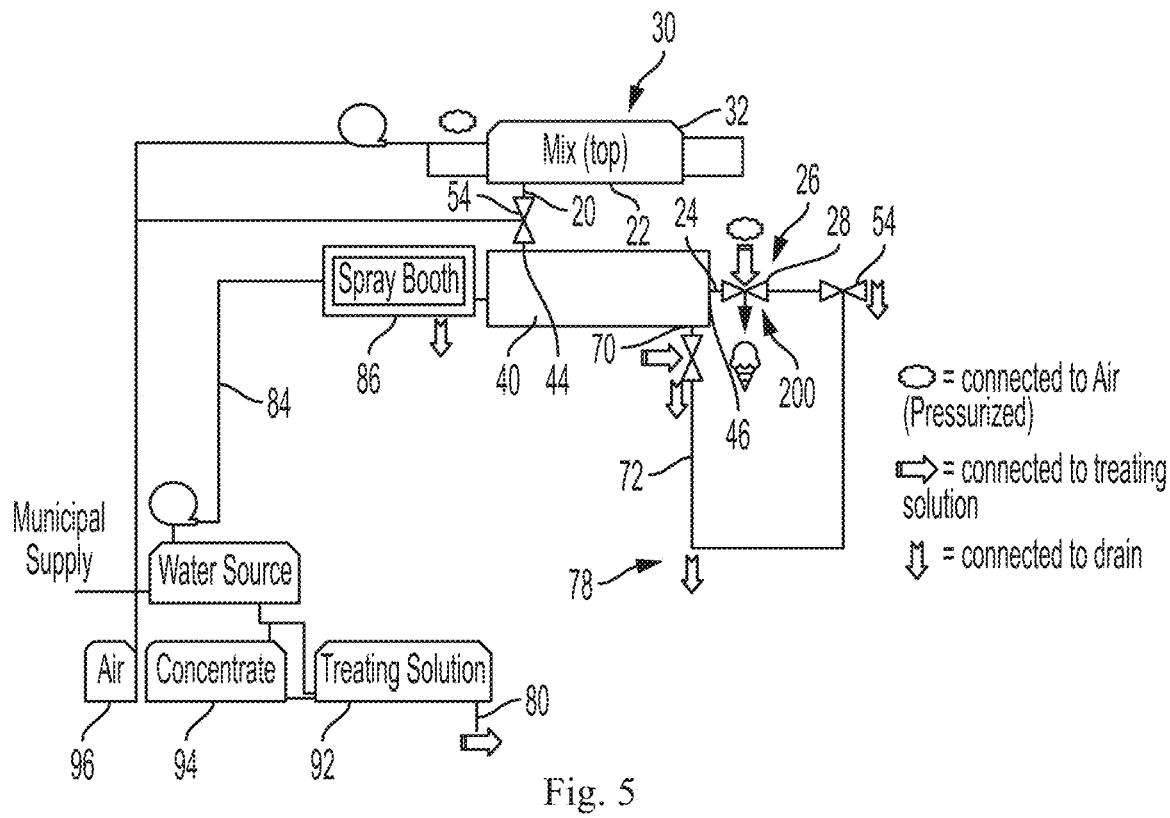
FIG. 5 is schematic of a further representative food processor.
Figure 6A:
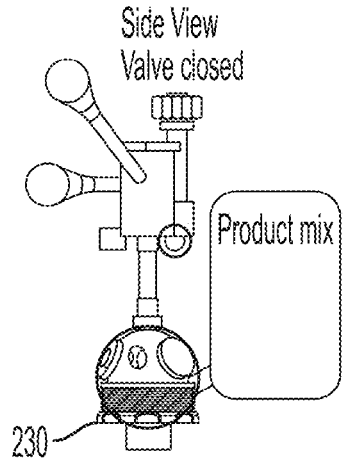
FIGS. 6A and 6B are side elevational views and FIG. 6C is a top plan view of the self-cleaning valve assembly as a dispensing valve.
Figure 6B:
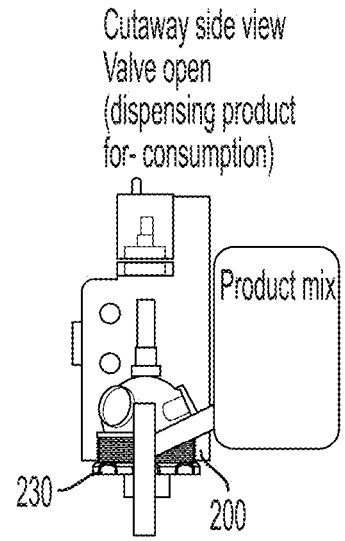
Figure 6C:
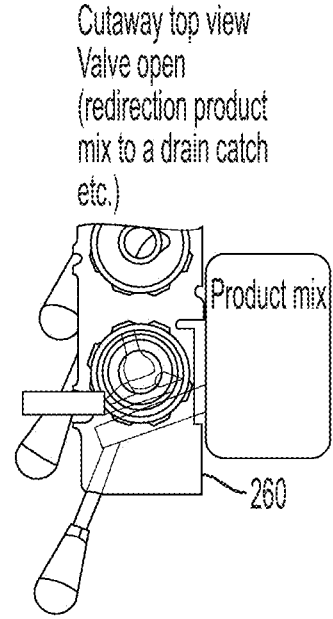

Referring to FIGS. 4 and 5, the treating solution input line 80 can also include a supply line 84 to an external spray booth 86. The external spray booth 86 can be a sealable volume having the treating solution line inlet and a booth outlet for draining, wherein the booth is sized to receive a component to be treated with the treating solution.

The treating solution source can be internal to the food processor 10, external to the food processor or a combination of internal and external components. For example, in the internal configuration, the food processor 10 can include a treating solution reservoir 92 within the food processor, wherein the treating solution reservoir is sized to retain a sufficient volume of the solution to perform the intended operation on the food flow path 20. In the external configuration, the treating solution input line 80 can function as a treating solution source, which is selectively connectable to the food flow path 20. In the combination configuration, the food processor 10 can include a treating solution concentrate or component reservoir(s) 94 from which a concentrate, component or additive is selectively entrained into a flow in the treating solution input line 80 which is then introduced into the food flow path 20. The treating solution input line 80 can also be fluidly connected an external path treating solution feed line 88, as seen in FIGS. 25 and 26, wherein the external path treating solution input line is fluidly connected to the self-cleaning valve assemblies, as set forth below. Thus, the external path treating solution feed line 88 is fluidly connected to the source of treating solution, such as the treating solution reservoir 92, the treating solution concentrate reservoir 94 or the treating solution input line 80. The external path treating solution feed line 88 can include a check valve to prevent food product from entering the external path treating solution feed line.

It is understood the treating solution reservoir 94 and the treating solution concentrate reservoir 92 can be a single reservoir or a plurality of reservoirs corresponding to the intended treating solutions to the introduced into the food flow path 20. That is, there may be a separate cleaning solution and separate sanitizing solution as well as a rinse solution with corresponding cleaning solution concentrate reservoir, sanitizing solution concentrate reservoir, and rinsing solution concentrate reservoirs 92.

The reservoir 92 of treating solution or the treating solution concentrate reservoir 94 can be pressurized to provide the motive force for the introduction of the treating solution into the food flow path 20 or the combination of the components into the treating solution. The pressurization can be accomplished by any of a variety of know mechanisms including bottled gas as well as compressor pumps, either independent of the food processor 10 or integral with the food processor. Referring to FIGS. 4 and 5, an air supply 96 can be fluidly connected to the recirculation line 50 as well as the treating solution input line 80 to function in the treatment of the food flow path 20, as well as the self-cleaning valves. The combining of the treating solution concentrate with the motive fluid can be accomplished by a variety of mechanisms including but not limited to a metering pump, having a given volume per stroke or cycle as well as in-line dispensers for dispensing in response to flow, such as monitored by a flow meter for regulating a stroke volume or frequency of stroke, or by a venturi as well as direct user introduction to obtain a given concentration of solution concentrate in the treating solution that is generated to treat the food processor 10. Alternatively, a concentrate pump can be used to meter in a predetermined volume (or mass) of concentrate to the treating solution input line 80. Further, a flow of water can be passed through a reservoir of solution concentrate to mix with the solution concentrate and then pass the resulting mixture to the treating solution input line 80.

The communication of the respective treating solution reservoir 92, concentrate reservoir 94 and the treating solution input line 80 (solution input line) can include valving to preclude or permit flow in accordance with the intending operations. The valving can be operable controlled by the controller 60. The control can be by virtue of individual valve control, or the concentrate pump, or implementation of a procedure or protocol involving a plurality of valve controls and associated timing. It is understood, the valves for communicating the treating solution to the relevant portion of the food flow path 20 can be manually operated.

For example, while the food processor 10 is shown with the treating solution input line 80 connected to a municipal water supply, it is contemplated the food processor can include a motive flow reservoir and a pump or just the pump communicating with the treating solution input line 80 for providing the motive flow in the treating solution input line 80. As with the valving of the food processor 10, the pump can be operably connected to the controller 60.

It is further contemplated the food processor 10 can include a variety of sensors know in the art, such as temperature sensors, flow sensors, flow meters, ph sensors, clarity or flow content sensors typically operably connected to the food flow path 20, the treating solution input line 80 or the drain lines and which can be operably connected to the controller 60 for verifying or monitoring or initiating the protocols implementable by the controller (or the food processor), including but not limited to introducing a sufficient amount of concentrate to a solvent to obtain a treating solution of a predetermined concentration.

The present disclosure provides a self-cleaning valve assembly 200, as seen in FIGS. 1, 4 and 5, in the food flow path 20 and in one configuration, the self-cleaning valve assembly is in the door 12 of the food processor 10 and in further configurations the self-cleaning valve assembly is in place of the dispensing valve 28 in the food flow path. That is, the self-cleaning valve assembly 200 can selectively dispense food product from the food flow path 20 of the food processor 10. Thus, a 4-way self-cleaning valve assembly 200 can selectively dispense food product from the food processor 10. However, it is recognized the self-cleaning valve assembly 200 can be located separate or outside of the door 12, depending of the specific configuration of the food processor 10.

While the self-cleaning valve assembly 200 is set forth in the functional location of the dispensing valve 28, it is understood the self-cleaning valve assembly can be located in any of a variety of locations in the food processor 10. The locations of the self-cleaning valve assembly 200, include, but are not limited to, the food flow path 20 intermediate the input end 22 and the output end 24. It is understood the self-cleaning valve assembly 200 can be located in any of a variety of locations in the food processor 10, and particularly in the food flow path 20, including replacing the primary drain valve 74 and/or the flow control valve 54. That is, the self-cleaning valve assembly 200 can be located where the valve assembly can direct or re-direct a flow of food product or treating solution into or out of the food flow path 20 as well as receive treating solution from external to the food flow path, such as a dead space in the self-cleaning valve assembly 200. As seen in FIG. 1, the self-cleaning valve assembly is located as the dispensing valve in the door 12.

Figure 7:
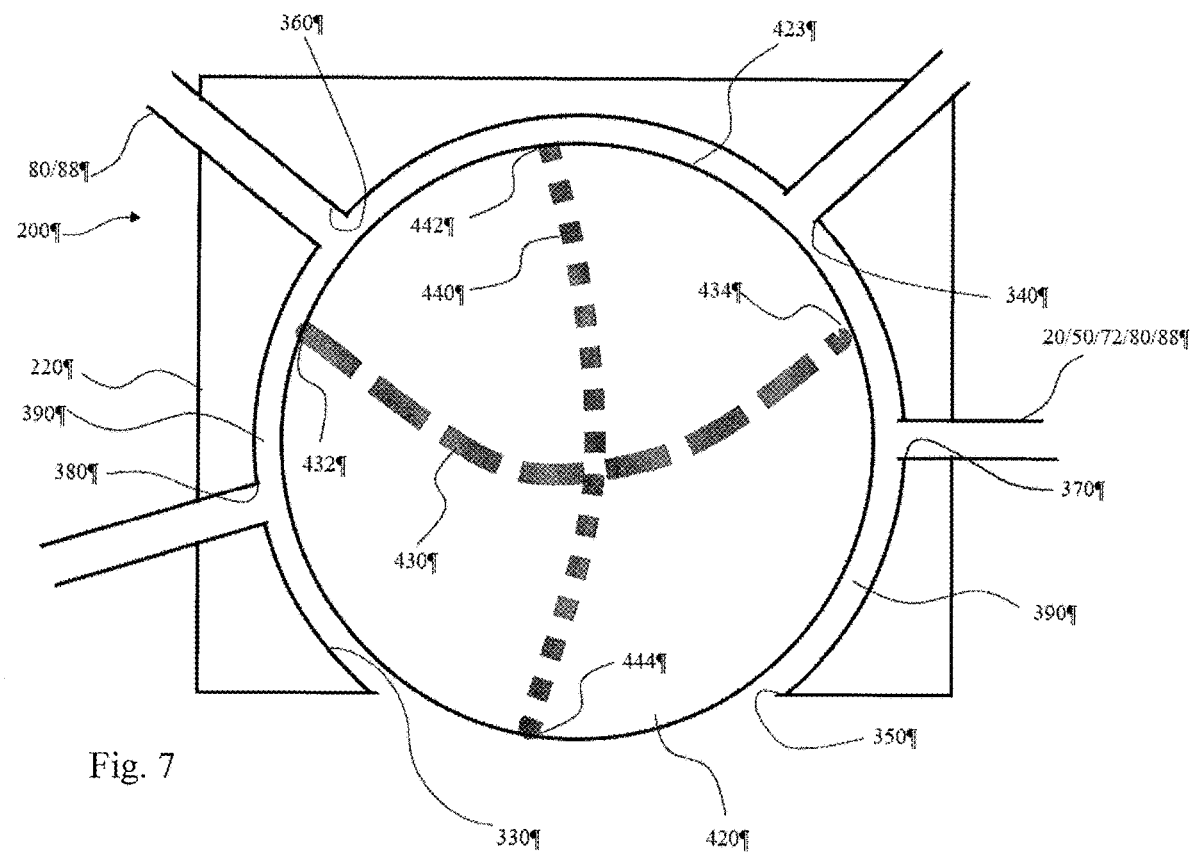
FIG. 7 is a schematic of a self-cleaning valve assembly.

Referring to FIG. 7, a schematic of the self-cleaning valve assembly 200 is shown, wherein the self-cleaning valve assembly includes a valve body 220 having a valve receiving cavity 330 and a valve 420 at least partly retained within the valve receiving cavity.

It is understood the valve body 220 can have a variety of configurations, such as single valve receiving cavity or a plurality of valve receiving cavities, such as a manifold assembly 260, shown in FIGS. 1, 6C, 8, and 34-39.

The valve receiving cavity 330 includes a food flow path inlet port 340; a food flow path outlet port 350; an external path treating solution inlet port 360; and a multivalent port 370. In certain configurations, the valve receiving cavity 330 can further include an internal path treating solution inlet port 380.

Figure 8:
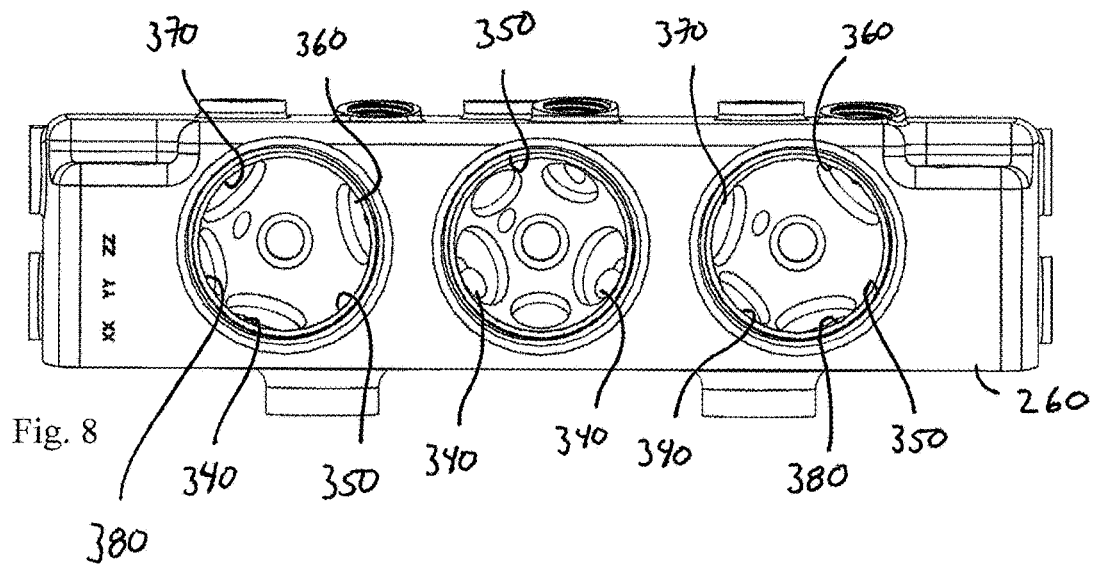
FIG. 8 is a bottom plan view of manifold assembly forming a valve body having a vale receiving cavity.
Figures 9A, 9B, 9C, 9D, 9E:
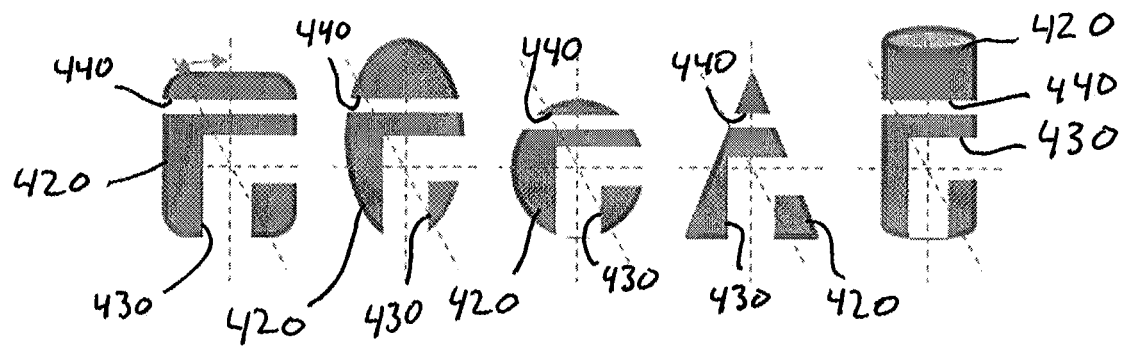

The food flow path inlet port 340 receives food product along the food flow path 20 from an upstream location, such as the freezer chamber 40. The food flow path outlet port 350 opens to a downstream portion of the food flow path 20, which can include dispensing the food product from the food processor 10. Referring to FIGS. 7 and 8, the food flow path outlet port 350 is in the bottom of the valve receiving cavity 330. It is understood a terminal portion of the food flow path 20 through the self-cleaning valve assembly 200 can be defined by the valve 420 or partly or completely defined by the valve body 220 (along with the food flow path outlet port 350).

The external path treating solution inlet port 360 is fluidly connected to the external path treating solution feed line 88 (or the treating solution input line 80), wherein the external path treating solution feed line 88 can be under constant pressure or can be valved (in addition to the check valve), wherein such valving is regulated manually or by the controller 60.

The multivalent port 370 can interface, or cooperatively align, with a variety of lines or valves of the food processor 10 and/or the door 12. The multivalent port 370 can connect to the recirculation line 50 or intermediate valving to connect to the recirculation line, the drain or even the treating solution input line 80. For example, depending on the configuration of the food processor 10, the multivalent port 370 can be fluidly connected to the drain line 72 and provide direct passage of food product from the self-cleaning valve assembly 200 (such as received from the food flow path 20) to the system drain valve. Alternatively, the multivalent port 370 can be fluidly connected to the recirculation line 50, wherein material passing from the self-cleaning valve assembly 200, through the multivalent port can be recirculated to a remote location of the food flow path 20. It is also contemplated the multivalent port 370 can be fluidly connected to a temporary storage. It is contemplated the temporary storage can retain the food product, temperature control the food product including chilling, or re-pasteurization or both, prior to the food product being reintroduced into the food flow path, such as but not limited to upstream of the freezer chamber 40. Thus, the multivalent port 370 can function as a recirculation port and/or a drain port.

As set forth below, in select configurations of the self-cleaning valve assembly 200, the valve receiving cavity 330 can further include the internal path treating solution inlet port 380, wherein the internal path treating solution inlet port is connected to the treating solution input line 80 of the food processor 10, or to the external path treating solution feed line 88 that supplies the external path treating solution inlet port 360. The internal path treating solution inlet port 380 can be valved or cooperate with an upstream valve for selectively presenting treating solution at the internal path treating solution inlet port.

The valve receiving cavity 330 further includes a flush drain line port 394, shown in FIG. 34. The flush drain line port 394 is outside of, fluidly separate from, the dead space 390 and typically outside of the body-valve seals 480, 480'. The flush drain line port 394 can connect to the system drain valve 76 or a separate flush drain line from the food processor 10. As set forth below, an external channel 426 on the valve 420 can be located to provide fluid communication from between the dead space 390 and the flush drain line port 394, wherein the flush drain line is separate from the food flow path 20. However, it is further contemplated the flush drain line port 394 can fluidly connect to the food flow outlet port 350 of the valve receiving cavity 330 and thus pass treating solution from a dead space to a drain.

The valve 420 is configured to be moveably positionable within at least a portion of the valve receiving cavity 330. Although FIGS. 7, 10, and 13-25 show the valve receiving cavity 330 and the valve 420 as spherical, it is understood the valve receiving cavity and the valve can be any of a variety of complementary configurations that provide for the necessary positioning to connect the respective ports and passages as set forth herein. For example, referring to FIGS. 9A-9E, the valve receiving cavity 330 and valve 420 can have elliptical, or oval cross sections. It is also contemplated the valve receiving cavity 330 and valve 420 can be conical or frusto-conical.

In select configurations, such as in FIGS. 7 and 10, there is at least one body-valve seal 480 between the valve 420 and the valve receiving cavity 330 of the valve body 220 that forms a sealed interface between the valve body and the valve. As seen in the FIG. 10, in one configuration, there is a first body-valve seal 480 and a spaced apart second body-valve seal 480'.

As seen in FIGS. 7, 10, 27, 28, 33, 34 dead space 390 is generally defined by the valve receiving cavity 330, an exterior surface 423 of the valve 420, the first body-valve seal 480 and the spaced apart second body-valve seal 480'. In one configuration, one body-valve seal 480 is proximal to a bottom of the valve 420 and the remaining body-valve seal 480' is proximal to a top of the valve. The dead space 390 defined between the valve receiving cavity 330 and the external surface 423 of the valve 420 is not a part of the food flow path 20 and is created by the operating tolerances necessary for the relative movement of the valve 420 and the valve body 220. Generally, the dead space 390 is a portion of the self-cleaning valve assembly 200 between a portion of the valve 420 and the valve body 220, and typically a portion that is not in the food flow path 20. However, it is understood the dead space may be a portion of the food flow path 20 having a restricted flow or a portion that is exposed to the food flow path in an open state of the self-cleaning valve assembly 200 or a closed state of the self-cleaning valve.

Referring to FIGS. 7, 9A-E, 10, 11-19, 21, the valve 420 includes an alpha passage 430 and a beta passage 440. The alpha passage 430 extends between a first alpha passage port 432 and a second alpha passage port 434. The beta passage 440 extends between a first beta passage port 442 and a second beta passage port 444. The specific configuration of the alpha passage 430 and the beta passage 440 is at least partly dictated by the configuration of the valve chamber 330 and the valve 420, which in turn is at least partly dictated by the available size valve body 220 such as many be located in the manifold assembly 260.

Although, the present configuration is shown with the alpha passage 430 and the beta passage 440 in the valve 420, it is understood the self-cleaning valve assembly 200 can include just the alpha passage or the alpha passage in conjunction with the beta passage, a theta passage, a gamma passage, a delta passage and/or more passages. In addition, as set forth below, the passages can have any of a variety of configurations as dictated by the intended operating setting and constructions of the valve receiving cavity 330 and the valve 420.

In one configuration shown in FIG. 33, the valve 420 can include a theta passage 450, wherein the theta passage extends from a first theta passage port 452 to a second theta passage port 454. It is contemplated the first theta passage port 452 can be exposed to the dead space and the second theta passage port 454 can be exposed to one of the other passages, such as the alpha passage 430 or to the flush drain line port 394, shown in FIG. 34. In one configuration, the first theta passage port 452 is open to the dead space 390 when positioned correctly within the body-valve seal 480. At least one of the body-valve seals 480 can include a channel or notch configured to align with such oriented theta passage. The second theta passage port 454 then communicates with the second alpha passage port 434 which is technically part of the food flow outlet port when the valve 420 is so oriented. Thus, the dead space 390 can be exposed to the treating solution while simultaneously cleaning second alpha passage port 434.

The valve 420 can be formed of a variety of materials, such as but not limited to metals, alloys and composites, such as but not limited to stainless steel. It is contemplated that the valve 420 can have a surface finish that inhibits food product collection and promotes cleaning, such as a mirror finish or polish. In further configurations, the valve 420 can include or have an oligodynamic coating, including known oligodynamic materials such as, but not limited to, aluminum, copper, silver, nickel or others as compliant with food safety regulations. Alternatively, if the valve 420 is polymeric, the polymer can include antimicrobial additives as know in the industry and as compliant with food safety regulations.

As seen in the FIGS. 20-24, the exterior surface 423 of the valve 420 includes a plurality of seal pads 470. A subset of the seal pads are rings, or seal rings 472, with a central aperture and a further subset of the seal pads have a continuous, or intermittent, or selectively moveable (such as between an engaged position and a disengaged, non-sealing position) sealing surface forming a disc 474 or other periphery. It is further contemplated the seal pads 470 can be a single integral body that is operably engaged with the valve 420 or valve receiving cavity 330. For purposes of description, the seal pads 470 are set forth as a plurality of separate elements, however it is understood the pads can be portions of a single integral body. Each of the first alpha passage port 432, the second alpha passage port 434, the first beta passage port 442, and the second beta passage port 444 has a concentric seal ring 472 on the adjacent surface of the valve body 420. That is, one seal ring 472 is located to surround each of the first alpha passage port 432, the second alpha passage port 434, the first beta passage port 442, and the second beta passage port 444. As seen in the Figures, the seal pads 470 project from the exterior of the valve 420 and depending on the position of the valve can occlude selective ports of the valve receiving cavity 330.

In one configuration, the valve 420 and corresponding seal pads 470 can be configured to preclude occlusion of the external path treating solution inlet port 360 and thus provide continuous exposure of dead space 390 to the external path treating solution inlet port. It is contemplated, the valve body 420 and location of the external path treating solution inlet port 360 in the valve receiving cavity 330 can be configured so that the orientation of the valve relative to the valve receiving cavity selectively exposes the dead space to the external path treating solution input line 88 as shown in FIG. 26.

While it is understood the seal pads 470 can be of different peripheries, such as but not limited to elongate, convoluted or multifaceted, for purposes of description, the seal pads are set forth herein as circular disc seals. That is, it is contemplated the seal pad 470 can have a shaped selected to occlude selective ports of the valve receiving cavity 330 as the valve 420 is positioned relative to the valve receiving cavity so as to control exposure of the dead space 390 to the respective port in the valve receiving cavity.

Thus, the seal pads 470 can be sized and located to ensure occlusion, or sealing, of the respective port in the valve receiving cavity 330 during movement of the valve 420 relative to the valve receiving cavity. For example, in one configuration, the seal pads 470 are configured to preclude or inhibit exposure of the food flow path inlet port 340 to the dead space 390. That is, the valve receiving cavity 330 and the valve 420 are configured to minimize or preclude direct fluid connection between the food flow path 20 and the dead space 390. However, as set forth below, it is recognized that there may be a presence of some food product in the dead space 390. Further, although one configuration of the present system provides for minimizing the amount of food product in the dead space 390, depending on the frequency of cleaning of the dead space, it is contemplated that the dead space can tolerate periodic exposure to the food flow path inlet port 340 or the food flow path outlet port 350.

While the Figs. depict the valve 420 having the projecting seal pads 470, it is contemplated that the interior surface 333 of the valve receiving cavity 330 can define or retain the seal pads. In a further configuration, the valve receiving cavity 330 and the valve 420 can be configured to expose the seal pads 470 to a locally increased spacing or separation between the valve and the valve receiving cavity. This increased spacing allows for a controlled gapping between the seal pads 470, the valve 420 and the valve receiving cavity 330 that is sufficient for treating solution introduced into the dead space 390 to treat an entire exterior of the seal pads.

In one configuration, the seal pads 470 are formed of an ultra-high molecular weight polyethylene (UWMW-PE). It has been found that this material does not require secondary lubricants and thus does not expose the food flow path 20 to lubricants. The seal pads 470 can include antimicrobial additives as compliant with food safety regulations.

In addition, as seen in the FIGS. 19-24, the valve 420 can include at least one external channel 426. In select configurations, the external channel 426 is selectively exposed to the external path treating solution feed line 88 via the external path treating solution port 360 and at least one of the multivalent port 370, the food flow path outlet port 350, or the flush drain line port 394. It is further contemplated the external channel 426 can extend to provide fluid communication between the dead space 390 and either or both of the alpha passage 430 and the beta passage 440, thereby introducing treating solution into portions of, or the entire alpha passage and/or beta passage. The external channel 426 can have any of a variety of configurations as dictated by the intended operating characteristics and configuration of the valve receiving cavity 330 and the valve 420.

The external channel 426 is configured to allow drainage of the dead space 390 passed at least one of the body-valve seals 480 and the seal rings 472, such as shown in FIG. 24, to the flush drain line port which, as set forth above, can communicate with the system drain of the food processor 10.

As seen in FIGS. 10, and 20-25, the valve 420 is coupled to a control shaft 484 for positioning the valve 420 relative to the valve receiving cavity 330 and hence relative to the ports in the valve receiving cavity. Although the positioning is set forth as rotational displacement about a single axis, it is understood the rotation could be about two or three axes. Further, the relative movement could be accomplished by translation or axial movement as well as combinations thereof.

Each valve 420 is rotatable about an axis, wherein the control shaft 484 extends from each valve along the axis. As seen in FIGS. 25 and 35, the control shaft 484 can include a projecting guide pin 486 and the handle 488. In a further configuration, it is contemplated the valve 420 and the valve body 220 can include a rack and pinion, wherein the rack is located on the exterior 423 of the valve 420 and the pinion extends from the valve body to drive the valve. A controllable motor or drive, operably connected to the controller 60, engages the pinion to position the valve 420 such that the motor or drive is operably controlled by the controller.

As seen in FIGS. 25 and 35, the present system also includes a guide collar 250. The guide collar 250 is sized to rotatably receive a portion of the control shaft 484 and includes a guide slot 252 sized to receive the guide pin 486. The guide slot 252 can include detents or capture recesses for engaging and seating the guide pin, and hence guide rod, in a particular location. Alternatively, the valve 420 can include a gear shaft extending along the axis of rotation, or the control shaft 484 can includes a gear, wherein the gear is fixed to the gear shaft, or the control shaft, and the controllable motor or drive engages the gear to position the valve and wherein the motor or drive can be operably controlled by the controller 60.

While the guide slot 252 is shown as planar, it is understood that configurations employing movement of the valve 420 about two axes, three axes as well as translational movement, the guide collar 250 may have guide slots extending in three dimensions.

While actuation of the control shafts 484 is shown by the extending manually actuated handles 488, it is understood movement of the valve 420 can be imparted by actuators or servos, which are connected to the controller 60. Upon the controller 60 actuating the self-cleaning valve assemblies 200, the present system provides for reduced operator input to clean the food processor 10. In addition, the self-cleaning valve assembly 200 can extend the period of operation of the food processor 10 between mechanical disassembly and cleaning.

As seen in the FIGS. 10, 20, 22, 23, 25, and 35, the valve body 220 can engage a compression surface such as a threaded compression nut 230 which acts upon at least one of the body-valve seals 480 and the valve 420. Setting of the compression nut 230 provides for the selective increase of pressure or compression of the body-valve seals 480 and 480' as well as the seal pads 470 including the seal rings 472 and the discs 474, thereby accommodating normal wear and compression of the seals, so as to minimize leakage of the self-cleaning valve assembly 200. The compression nuts 230 can be located at a top of the valve 420, the bottom of the valve or both at the top and the bottom of the valve. Thus, compression of the bottom body-valve seal 480 can be adjusted without requiring disassembly of the self-cleaning valve assembly 200. Thus, as the self-cleaning valve assembly 200 can further extend time between required disassembly as well as accommodate normal wear of the body-valve seal, thereby extending the useful life of the body-valve seal. However, it is understood the compression surface can be any surface that exerts a pressure on the body-valve seal 480 and the body-valve seal can be a close or tight fitting sealing interface such as UHMWPE, ultra-high-molecular-weight polyethylene.

Thus, as seen in FIGS. 4 and 25, the self-cleaning valve assembly 200 is in fluid communication with the external path treating solution feed line 88, the food flow path 20 and the recirculation line 50. Referring to FIGS. 1 and 4, the self-cleaning valve assembly 200 provides for the dispensing of food product from the food flow path 20 or the diversion of food product from the food flow path 20 through the multivalent port 370 to the recirculation line, which in turn can pass to the drain, buffer or storage.

That is, the present system provides a self-cleaning valve assembly 200 in the food flow path 20 of the food processor 10 and particularly a 3-way self-cleaning valve, though the system is not limited to a 3-way valve, and can be a four, five, or six-way self-cleaning valve.

Thus, in a first configuration, the valve receiving cavity 330 includes the (i) the food flow path inlet port 340; (ii) the food flow path outlet port 350; (iii) the external path treating solution inlet port 360; and (iv) the multivalent port 370 in conjunction with (i) the valve 420 having the alpha passage 430 extending between the first alpha passage port 432 and the second alpha passage port 434 and the beta passage 450 extending between the first beta passage port 442 and the second beta passage port 444, and the external channel 426, and the (ii) seal pads 470, configured as individual seal rings are configured to selectively:

1.1. occlude the food flow path inlet port and the multivalent port and simultaneously fluidly connect the external path treating solution inlet port 360 to the dead space 390 and expose the external channel 426 to the flush drain line; and 1.2. fluidly connect the food flow path inlet port to the food flow path outlet port; and 1.3. fluidly connect the food flow path inlet port to the multivalent port.

Specifically in 1.1, the food flow path inlet port 340 and the multivalent port 370 are occluded by the valve 420 and particularly by the seal pads 470, the second alpha passage port 434 is open to the food flow path outlet port 350 and the external path treating solution inlet port 360 is exposed to the dead space 390 and the external channel 426 is exposed to the flush drain line port 394. This allows isolation of the food product and the food flow path 20, while the dead space 390 of the self-cleaning valve assembly 200 is treated (which includes any of wash, clean, rinse, or sanitize). As seen in FIG. 26, the treating solution can be continuously presented through the external path treating solution feed line 88 to the external path treating solution inlet port 360 and into the dead space 390, wherein the treating solution can then pass via the external channel 426 to the system drain.

Specifically in 1.2, the food flow path inlet port 340 is aligned the first alpha passage port 432 and the second alpha passage port 434 is aligned with the food flow path outlet port 350 to pass food product through the self-cleaning valve assembly 200 such as to dispense food product from the food processor 10; the first beta passage port 442 is aligned with the multivalent port 370, and the external path treating solution inlet port 360 is exposed to the dead space 390 and the external channel 426 is not exposed to the flush drain line port 394.

Specifically in 1.3, the food flow path inlet port 340 is aligned with the first beta passage port 442 and the second beta passage port 444 is aligned with the multivalent port 370; the first alpha passage port 432 is isolated and the second alpha passage port 434 is aligned with food flow path outlet port 350, and the external path treating solution inlet port 360 is exposed to the dead space 390 and the external channel 426 is not exposed to the flush drain line port 394.

Thus, the valve 420 and the orientation with respect to the valve receiving cavity 330 provide the recited flows for selectively implementing treatment of the food flow path 20, or portions of the food flow path, including the freezer chamber 40 and the self-cleaning valve assembly 200. In addition, the valve 420 can be orientated to provide for an external application of treating solution for treatment of the alpha passage 430.

This configuration can further include the theta passage 450 seen in FIG. 33. The theta passage 450 fluidly connects the dead space 390 to one of the other passages, such as the alpha passage 430 or the beta passage 440. Specifically, the self-cleaning valve assembly 200 is configured to pass treating solution through the dead space 390 as well as part of the food flow path 20, such as the alpha passage 430 in the valve 420.

It is further contemplated that the valve receiving cavity 330 and the valve 420 can be configured to fluidly connect the food flow path inlet port 340 to the food flow path outlet port 350, with the external path treating solution inlet port 360 fluidly connected to the dead space 390 and the external channel 426 exposed to the flush drain line port 394. That is, the exterior channel 426 on the valve 420 can be oriented to extend across one of the seal pads 470 such as the seal ring 472 and the body-valve seals 480, 480' or the dead space 390 can be simultaneously exposed to the external path treating solution inlet port 360 and the flush drain line port 394, while one of the alpha passage 430 and the beta passage 440 fluidly connects the food flow path inlet port 340 to the food flow path outlet port 350.

Second Configuration

In the second configuration, the valve receiving cavity 330 includes the food flow path inlet port 340; (ii) the food flow path outlet port 350; (iii) the internal path treating solution inlet port 380, (iv) the external path treating solution inlet port 360; and (v) the multivalent port 370. The internal path treating solution inlet port 380 is connected to the treating solution input line 80 (or the external path treating solution feed line 88). In this configuration, the self-cleaning valve assembly 200 can be used to introduce sufficient treating solution to the food flow path 20, via the flow path solution line 80, to impart the desired treatment of a portion of the food flow path within a predetermined time.

In the second configuration, the valve 420 includes the alpha passage 430 extending between the first alpha passage port 432 and the second alpha passage port 434 and the beta passage 440 extending between the first beta passage port 442 and the second beta passage port 444, and the external channel 426, and the (ii) seal pads 470, including the seal rings 472 are configured to selectively:

2.1 occlude the food flow path inlet port 340 and the multivalent port 370 and fluidly connect the external path treating solution inlet port 360 to the dead space 390 and expose the external channel 426 to the flush drain line port 394;

2.2 fluidly connect the food flow path inlet port to the food flow path outlet port;

2.3 fluidly connect the food flow path inlet port to the multivalent port; and 2.4 fluidly connect the internal path treating solution inlet port 380 to the food flow path inlet port 340.

Specifically in 2.1, the food flow path inlet port 340, the internal path treating solution inlet port 380 and the multivalent port 370 are occluded by the valve 420 and particularly the seal pads 470. The second alpha passage port 432 is open to the food flow path outlet port 350 and the external path treating solution port 360 is exposed to the dead space 390 and the external channel 426 is exposed to the flush drain line port 394. This allows isolation of the food product and the food flow path 20, while the dead space of the self-cleaning valve assembly 200 is treated (which includes any of wash, clean, rinse, or sanitize).

Specifically in 2.2, the food flow path inlet port 340 is aligned the first alpha passage port 432 and the second alpha passage port 434 is aligned with the food flow path outlet port 350 to pass food product through the self-cleaning valve assembly 200 such as to dispense food product from the food processor 10; the first beta passage port 442 is aligned with the multivalent port 370 and the second beta passage port 444 is aligned with the internal path treating solution inlet port 380, wherein the valves of the food processor can preclude flow through the internal path treating solution inlet port, and the external path treating solution inlet port 360 is exposed to the dead space 390 and the external channel 426 is not exposed to the flush drain line port 394.

Specifically in 2.3, the food flow path inlet port 340 is aligned with the first beta passage port 442 and the second beta passage port 444 is aligned with the multivalent port 370; the first alpha passage port 432 is aligned with the internal path treating solution inlet port 380 and the second alpha passage port 434 is aligned with food flow path outlet port 350, and the external path treating solution inlet port 360 is exposed to the dead space 390 and the external channel 426 is not exposed to the flush drain line port 394.

Specifically in 2.4, the food flow path inlet port 340 is aligned with the second beta passage port 444 and the first beta passage port 442 is aligned with the internal path treating solution inlet port 380; the first alpha passage port 432 is aligned with the multivalent port 370 and the second alpha passage port 434 is aligned with food flow path outlet port 350, and the external path treating solution inlet port 360 is exposed to the dead space 390 and the external channel 426 is not exposed to the flush drain line port 394.

The second configuration can further include the theta passage 450. The theta passage 450 fluidly connects the dead space 390 to one of the passages, such as the alpha passage 430 or the beta passage 440. Specifically, the first and second beta passage ports 442, 444 and the first alpha passage port 432 are occluded by the valve 420, and particularly the seal pads 470 and the second alpha passage port 434 is aligned with the food flow path outlet port 350, and the internal path treating solution inlet port 380 is fluidly connected to the dead space 390 and hence first theta passage port 452 and the second theta passage port 454 area exposed to the alpha passage 430. This allows treatment of the alpha passage 430 with the treating solution, such as wash, clean, rinse or sanitize. It is understood the treating solution can be presented to the self-cleaning valve assembly 200 through any of the external path treating solution feed line, the internal path treating solution line or the food flow path. As set forth above, the treating solution can be provided from a common source for each of these lines, or each line can have a separate source. The theta Depending on the desired construction, the valve body 220 for each of a plurality of valve assemblies 220 can be defined by the manifold assembly 260, wherein the manifold assembly defines a corresponding number of food flow path inlets 340, dispensing ports (or food flow path outlet ports 350), multivalent ports 370 (such as recirculation line ports) as well as drain ports and the external path treating solution inlet ports and the internal path treating solution ports. While the Figs. illustrate the manifold assembly 260 having a plurality of recirculation line ports, drain ports, external path treating solution feed line ports, such as a port for each self-cleaning valve in the manifold, it is understood the number of these external ports can be reduced from the present Figs.

In one configuration, the manifold assembly 260 is located in the door and includes the valve body 220, wherein the valve body defines at least one valve receiving cavity 330 and the valve receiving cavity retains at least one valve 420.

As seen in the FIGS. 8 and 35, the manifold assembly 260 can include three valve receiving cavities 330. However, it is understood the manifold assembly 260 can include one, two, three, four, five, six or more valve receiving cavities 330, wherein each valve receiving cavity includes a corresponding valve body 420, wherein the valve body is positionable or moveable relative to the corresponding valve receiving cavity. It is understood that each valve receiving cavity 330 and corresponding valve body 420 can be similarly or differently configured. As the valve 420 is positionable relative to the valve receiving cavity 330, it is understood the valve body can be rotatable; translatable or both relative to the valve chamber. For purposes of description, a single valve receiving cavity 330 and corresponding valve body 420 have been set forth in detail.

The manifold assembly 260 can be configured such that each food flow path 20 of the food processor 10 can be divided to one or more self-cleaning valve assemblies 200. In one configuration of the manifold assembly 260, each food flow path 20 is uniquely connected to a corresponding self-cleaning valve assembly 200 and each food flow path is connected to a third self-cleaning valve assembly.

It is also recognized that the self-cleaning valve assembly 200 is set forth as independently functioning, acting in parallel with the other self-cleaning valve assemblies, it is understood the valve assemblies can be serially disposed so that an input or output from one valve assembly is the output or input to a second valve assembly. Further, while each of the valve receiving cavities 330 in the present manifold assembly 260 has been shown as part of a multi-port self-cleaning valve assembly, it is contemplated that the individual valve functions can be separated into a plurality of in-line or sequential valves, wherein such valves can be self-cleaning as necessary to accommodate the required cleaning and performance for local, state and federal regulations. That is, if a given valve directs or contacts food product, then such valve may be self-cleaning, while a valve that merely directs or contacts treating solution may not need to be self-cleaning.

It is further contemplated that as the term treating solution encompasses a gas, such as air, wherein the pressurized air can be passed through the treating solution line 80, and or the external path treating solution feed line 88, thereby exposing the dead space 390 as well as the food flow path inlet port 340, the food flow path outlet port 350, the alpha passage 430 and the beta passage 440 to a pressurized air flow which can be used to dry the respective channel, or at least remove sufficient liquid from the system, such that upon re-freezing any residual liquid does not detrimentally impact the system or performance.

The present self-cleaning valve assembly 200 can be used in the food processor 10, such as in, but not limited to the door 12, and thermally exposed to the cooling loop of the food processor (or a separate cooler or chiller), wherein the self-cleaning valve assembly can be maintained at an operating temperature that maintains the operating temperature of the food product. For example, the self-cleaning valve assembly 200 can function at less than 40° F., such as +/−7° F., as well as be cleaned at such temperature. Similarly, the material of the body-valve seals as well as the seal pads 470 can selected to accommodate heat treatment of the valve assembly or food flow path 20, such as in a re-pasteurization process for treating the food processor 10, along with food product in the food flow path.

Thus, the self-cleaning valve assembly 200 can be used in conjunction with a heat treating system. For example, the self-cleaning valve 200 can be heated with any of a variety of food processor heating systems to a time-temperature profile that is sufficient to pasteurize (or re-pasteurize) the food product as residing in the food flow channel 20. In select configurations, the time-temperature profile is selected to meet the time-temperature profile necessary for regulation approved heating and/or pasteurization of the food product. Thus, the self-cleaning valve assembly 200 can be heated sufficiently to heat any food product within the self-cleaning valve assembly to a sufficient time-temperature profile to pasteurize (or re-pasteurize) the food product in the self-cleaning valve assembly.

Conversely, the present system can provide the necessary cleaning without adversely raising the temperature of food product in portions of the food flow path 20 in or near the door 12. That is, the flow control mechanisms of the door 12 of the food processor 10 can be treated without requiring draining of food product from the freezer chamber 40. The self-cleaning valve assembly 200 can be treated (washed, rinsed, cleaned, or sanitized) without requiring disassembly and with requiring the draining of food product from the freezer chamber 40. For example, the food flow path 20 can be selectively isolate from the dead space 390 and treating solution can be passed through the dead space without contacting any food product in the food flow path 20. It is understood that all these treatments can be accomplished with the door 12 in the closed or operable position. That is, the door 12 now has clean-in-place capability.

By employing the self-cleaning valve assembly 200, the present system reduces the downtime of the food processor 10 as well as reduce operator error. In addition, the present system reduces the number of valves thereby reducing cost, complexity and cleaning time while extending operable seal life.

Referring to FIGS. 36-39, in yet another configuration, the self-cleaning valve assembly 200 can be implemented in a draw type valve having peripheral seals 462 such as O-rings. In this construction, the valve 420 is cylindrical and includes peripheral grooves 464 to seat corresponding O-rings 462 and the treating solution input line 80 or the external path treating solution feed line 88 extends to the groove 464. Thus, as the treating solution is passed from the treating solution input line 80 or the external path treating solution feed line 88, the treating solution exits from under the O-ring 462, at least slightly displacing the O-ring and treating the now exposed surfaces with treating solution. In one configuration, the valve receiving cavity 330 can include an accommodating recess 432 spaced from normal operating positions, such that upon disposing the valve 420 to locate the O-ring 462 adjacent the accommodating recess, the O-ring can be unseated by the pressure of the treating solution flow.

By providing a self-cleaning valve assembly 200 in the food flow path and particularly the door 12, the time between mechanical tear down, cleaning and re-assembly of the food processor can be extended to 7 days, or 14 days or 28 days to 90 days. Thus, the food processor 10 includes a reservoir 30, a food flow path 20 having a freezer chamber 40 and a self-cleaning valve assembly 200 in the food flow path, wherein the self-cleaning valve assembly provides for exposure of the portion of the food flow path as well as the portion of the valve assembly that is not continuously in the food flow path to the treating solution.

Operation

Referring to the FIG. 4, the incorporation of the present self-cleaning valve assembly 200 in the present food processor 10, includes a no dispense state, wherein the self-cleaning valve assembly is located as the dispensing valve and is position to preclude flow from the food flow path 20. The food processor 10 can then be disposed in a dispense state, wherein the self-cleaning valve assembly 200 is positioned to dispense food product from the food flow path 20 to dispense food product and the remaining valves are positioned to draw (or receive) food product from a supply of food product, such as a bag in box 34 or food product reservoir 30 below the freezer chamber 40. In a further scenario, the present system provides for discarding food product from the food flow path 20, wherein the food flow path can be treated with the treating solution. The valves are positioned such that the self-cleaning valve 200 connects the food flow inlet port 340 to the multivalent port 370 for draining the freezer chamber 40. In a further scenario, the food processor 10 can be configured to recirculate treating solution through at least portions of the food flow path 20. This allows recirculation of the treating solution through the freezer chamber 40 and the self-cleaning valve assembly 200, wherein the mix pump of the food processor can be used to impart the recirculation.

In a further state, the food processor 10 can rinse and clean pump and food flow path 20 lines, wherein the valves can be used to selectively drain or recirculate the treating solution.

In the food processor 10 employing the food product reservoir 30 above the freezer chamber 40 to supply the food product, self-cleaning valve assembly 200 can be used to selectively drain food product from the food flow path 20, as well as selectively recirculate treating solution through portions of the food flow path.

The food processor 10 thus can provide a closed loop system that can replace the food product within the food flow path 20 with treating solution (such as sanitizing, cleaning, sterilizing, or rinsing) during standby status of the food processor 10. This not only can provide extended sanitizing to the select portions of the food flow path 20, but it also allows for energy savings coupled with higher product quality as the food product is not being exposed to multiple extended periods of beater agitation otherwise necessary to keep the food product mobile for product quality purposes.

Thus, the present disclosure provides for removing food product from at least a portion of the food flow path 20, treating the portions of the food flow path with the treating solution; draining the treating solution and rinsing, without requiring operator intervention. The controller 60 can then automatically reintroduce food product into the food flow path 20 in preparation for dispensing finished food product. The present system thus allows the food product to be removed from at least portions of the food flow path 20, such that those portions of the food flow path can be treated with treating solution, wherein the food product is only reintroduced into the food flow path after appropriate treatment of the food flow path and necessary timing for bringing the food processor 10 back on line.

The self-cleaning valve assembly 200 includes seals and passageways to permit selective exposure of external and internal portions of the valve to the treating solution. For example, in some self-cleaning valve assemblies, a self-flushing ball cooperates with a valve receiving chamber of the valve assembly to provide flow of the food product when the valve is open. In one configuration of a self-cleaning valve assembly 200, holes allow the food product to fill the cavity just as the food product fills the piping. When flushing the lines, the cleaning solution fills the cavity and displaces the food product. However, it has been found advantageous for the self-cleaning valve assembly 200 to limit exposure of portions of the valve to the food product, while providing for selective exposure of such portions to the treating solution.

Therefore, the food processor 10 can include (a) the reservoir 30 configured to retain a food product; (b) the food flow path 20 connected to the reservoir and extending from the upstream portion 22 to the downstream portion 24, the food flow path including the freezer chamber 40 having the inlet port 44 for receiving food product and the outlet port 46 for passing food product from the freezer chamber; (c) the treating solution source; (d) the recirculation line 50 extending from the treating solution source and selectively fluidly connected to at least one of the food flow path, the inlet port, and the outlet port; and the (e) a self-cleaning valve assembly 200 selectively fluidly connecting the recirculation line to the outlet port, wherein the self-cleaning valve assembly includes the valve body 220 having the valve receiving cavity 330, the valve receiving cavity including the food flow path inlet port 340 and the food flow path outlet port 350; and (ii) the valve 420 disposed in the valve receiving cavity, the valve moveable relative to the valve receiving cavity and defining the dead space 390 between the exterior surface 423 of the valve 420 and the valve receiving cavity. It is contemplated the dead space 390 is fluidly connected to the treating solution source. Further, the dead space 390 can be selectively fluidly connected to the treating solution source. In addition, the freezer chamber 40 can include the drain port 70.

Thus, a method is providing including (a) providing the food flow path 20 having the freezer chamber 40, as shown in FIG. 4, in the food flow path; (b) fluidly connecting the flow control valve 54 to the inlet 44 of the freezer chamber, the flow control valve configured to selectively permit or preclude passage of food product into the freezer chamber; (c) fluidly connecting the dispensing valve assembly 200 to an outlet of the freezer chamber, the dispensing valve including the valve body 220 defining the valve receiving cavity 330 and the valve 420, the valve receiving cavity and the valve at least partly defining the dead space 390 between the exterior 423 of the valve 420 and the valve receiving cavity; and (d) passing a treating solution through the dead space. The method contemplates wherein passing the treating solution through the dead space includes passing the treating solution from one of the external treating solution feed line 88, the internal treating solution line, and the food flow path 20.

The method can include configuring the dispensing valve assembly 200 as a 3-way valve or a ball valve. In the method, the treating solution feed line can be the external path treating solution feed line, the internal path treating solution feed line or the food flow path. The method further contemplates configuring the dead space 390 to extend between the valve receiving cavity 330 and the valve 420, the valve receiving cavity being sized to at least partly retain the valve, wherein the body-valve seal 480, 480' extends between the valve body and the valve.

A further method is disclosed including (a) providing the food flow path 20 configured to pass food product from the freezer chamber 40 through the self-cleaning valve assembly 200, functioning as the dispensing valve, the self-cleaning valve assembly having the dead space 390 separate from the food flow path, the dead space at least partly defined by the valve receiving cavity 330 and the valve 420 moveable relative to the valve receiving cavity; and (b) fluidly connecting the dead space to the treating solution input line 80. The method can include passing treating solution from one of the internal treating solution line, the external treating solution line 88 and the food flow path 20. The method includes configuring the dispensing valve, such as the self-cleaning valve assembly 200, to divert food product from the food flow path 20 through the multivalent port 370 to the recirculation line 50. It is understood the method can include configuring the self-cleaning valve assembly 200, as a dispensing valve, to include a ball valve having the valve 420 with the alpha passage 430 and the beta passage 440. The method can include configuring the self-cleaning valve assembly 200 to fluidly connect the dead space 390 to the treating solution line 80 simultaneous to passing the food product along the food flow path 20. Another step of the method includes configuring the self-cleaning valve assembly 200 to selectively either (i) pass food product along the food flow path 20 and (ii) pass food product to the multivalent port 370 to the recirculation line 50 separate from at least a portion of the food flow path. Another step in the method can include configuring the self-cleaning valve assembly 200 to selectively expose the dead space 390 to the treating solution. The method can further include configuring the self-cleaning valve assembly 200 to continuously expose the dead space 390 to the treating solution. The method includes configuring the self-cleaning valve assembly 200 as a 3-way valve. Similarly, the method includes configuring the self-cleaning valve assembly 200 as a ball valve. The method can further include configuring the dead space 390 to extend between the valve receiving cavity 330 and the valve 420, wherein the valve receiving cavity is sized to at least partly retain the valve, wherein the body-valve seal 480, 480' extends between the valve body and the valve.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:
1. A food processor comprising:
   (a) a food flow path extending from an upstream portion to a downstream portion;
   (b) a freezer chamber in the food flow path; and
   (c) a self-cleaning valve assembly fluidly connected to the food flow path, the self-cleaning valve assembly including a valve body defining a valve receiving cavity and a valve moveably disposed within the valve receiving cavity to define a dead space between an exterior surface of the valve and the valve receiving cavity, wherein the valve includes an alpha passage extending between a first alpha passage port and a second alpha passage port, and a beta passage extending between a first beta passage port and a second beta passage port.
2. The food processor of claim 1, further comprising a body-valve seal between the valve body and the valve, and wherein the valve includes an external channel configured to extend across the body-valve seal in a given position of the valve.

3. The food processor of claim 1, wherein the valve receiving cavity includes (i) a food flow path inlet port; (ii) a food flow path outlet port; and (iii) a treating solution inlet port, wherein the valve and the valve receiving cavity are configured to selectively:
    i) fluidly connect the food flow path inlet port to the food flow path outlet port.

4. The food processor of claim 1, wherein the valve receiving cavity includes (i) a food flow path inlet port; (ii) a treating solution inlet port, and (iii) a multivalent port, wherein the valve and the valve receiving cavity are configured to selectively:
    ii) simultaneously fluidly connect the food flow path inlet port to the multivalent port and fluidly connect the alpha passage to the treating solution inlet port.

5. The food processor of claim 1, wherein the valve receiving cavity includes (i) a food flow path inlet port; (ii) a food flow path outlet port; and (iii) a treating solution inlet port, wherein the valve and the valve receiving cavity are configured to selectively:
    iii) fluidly connect the treating solution inlet port to one of the food flow path inlet port and the food flow path outlet port.

6. The food processor of claim 1, wherein the valve receiving cavity includes (i) a food flow path inlet port; (ii) a food flow path outlet port; (iii) a treating solution inlet port, and (iv) a multivalent port, wherein the valve and the valve receiving cavity are configured to selectively:
    iv) simultaneously fluidly connect the treating solution inlet port to the food flow path inlet port and fluidly connect the multivalent port to the food flow path outlet port.

7. A food processor comprising:
    (a) a food flow path extending from an upstream portion to a downstream portion to pass a food product from the upstream portion to the downstream portion;
    (b) a freezer chamber in the food flow path; and
    (c) a flow control valve connected to the food flow path, wherein the flow control valve is a self-cleaning valve assembly;
the self-cleaning valve assembly comprising
    i) a valve body defining a valve receiving cavity having a plurality of ports; and
    ii) a valve at least partly disposed within the valve receiving cavity, wherein an exterior surface of the valve includes a seal pad.

8. The food processor of claim 7, wherein the valve includes an alpha passage extending between a first alpha passage port and a second alpha passage port.

9. The food processor of claim 7, wherein the valve includes an alpha passage extending between a first alpha passage port and a second alpha passage port, and a beta passage extending between a first beta passage port and a second beta passage port.

10. The food processor of claim 7, further comprising a body-valve seal between the valve body and the valve, and wherein the valve includes an external channel configured to extend across the body-valve seal in a given position of the valve.

11. The food processor of claim 7, wherein the valve receiving cavity and the exterior surface of the valve define a dead space, and the seal pad is configured to selectively occlude at least one of the plurality of ports of the valve receiving cavity in a predetermined position of the valve relative to the valve receiving cavity.

12. The food processor of claim 7, wherein the plurality of ports includes (i) a food flow path inlet port, (ii) a multivalent port; (iii) at least one of an external path treating solution inlet port and a flood flow path outlet port.

13. The food processor of claim 7, wherein the plurality of ports includes (i) a food flow path inlet port, (ii) a multivalent port; (iii) an external path treating solution inlet port, and (iv) a flood flow path outlet port.

\* \* \* \* \*